(12) United States Patent
Hage et al.

(10) Patent No.: US 10,815,616 B2
(45) Date of Patent: Oct. 27, 2020

(54) OXIDATIVE METHOD

(71) Applicant: Catexel Technologies Limited, London (GB)

(72) Inventors: Ronald Hage, Leiden (NL); Karin Maaijen, Leiden (NL); Yfranka Petronella Areke Roelofsen, Hekendorp (NL)

(73) Assignee: Catexel Technologies Limited, London (GB)

( * ) Notice: Subject to any disclaimer, the term of this patent is extended or adjusted under 35 U.S.C. 154(b) by 238 days.

(21) Appl. No.: 15/834,830

(22) Filed: Dec. 7, 2017

(65) Prior Publication Data
US 2018/0094384 A1 Apr. 5, 2018

Related U.S. Application Data

(63) Continuation of application No. PCT/GB2016/051733, filed on Jun. 10, 2016.

(30) Foreign Application Priority Data

Jun. 10, 2015 (EP) .................................... 15171384

(51) Int. Cl.
*D21C 9/14* (2006.01)
*C11D 3/395* (2006.01)
(Continued)

(52) U.S. Cl.
CPC ............... *D21C 9/14* (2013.01); *A01N 35/10* (2013.01); *A01N 43/90* (2013.01); *A01N 59/00* (2013.01);
(Continued)

(58) Field of Classification Search
None
See application file for complete search history.

(56) References Cited

U.S. PATENT DOCUMENTS 2,477,631 A 8/1949 Levy et al.
5,077,394 A 12/1991 Dolphin et al.
(Continued)

FOREIGN PATENT DOCUMENTS

EP 0458397 A2 11/1991
EP 0909809 A2 4/1999
(Continued)

OTHER PUBLICATIONS

Albela et al., Synthesis and X-ray structure of the MnIICl2 and MnIIIF2 complexes of N,N'-dimethyl-2,11-diaza[3,3](2,6)pyridinophane. High-field electron paramagnetic resonance and density functional theory studies of the MnIII complex. Evidence for a low-lying spin triplet state. Inorg Chem. Oct. 3, 2005;44(20):6959-66.
(Continued)

*Primary Examiner* — Joseph D Anthony
(74) *Attorney, Agent, or Firm* — McCarter & English, LLP; Yu Lu

(57) ABSTRACT

The present invention relates to a method of generating chlorine dioxide from chlorite salts in the presence of a manganese ion-containing complex, a method of treating a substrate with a chlorine-containing oxidant in the presence of a manganese ion-containing complex and related aqueous media, kits and compositions.

19 Claims, 3 Drawing Sheets

(51) Int. Cl.
*A01N 59/00* (2006.01)
*A01N 59/16* (2006.01)
*B01J 31/18* (2006.01)
*B01J 31/22* (2006.01)
*C02F 1/76* (2006.01)
*D21C 9/10* (2006.01)
*A01N 35/10* (2006.01)
*A01N 43/90* (2006.01)
*C02F 101/20* (2006.01)
*C02F 103/02* (2006.01)

(52) U.S. Cl.
CPC ............ *A01N 59/16* (2013.01); *B01J 31/182* (2013.01); *B01J 31/2243* (2013.01); *C02F 1/76* (2013.01); *C11D 3/3951* (2013.01); *C11D 3/3956* (2013.01); *D21C 9/1042* (2013.01); *D21C 9/1078* (2013.01); *D21C 9/144* (2013.01); *B01J 31/1835* (2013.01); *B01J 2231/70* (2013.01); *B01J 2531/0252* (2013.01); *B01J 2531/0258* (2013.01); *B01J 2531/72* (2013.01); *C02F 2101/203* (2013.01); *C02F 2101/206* (2013.01); *C02F 2103/023* (2013.01); *C02F 2303/04* (2013.01)

(56) References Cited

U.S. PATENT DOCUMENTS

| | | | |
|---|---|---|---|
| 5,630,906 A * | 5/1997 | Boe | B01J 31/1815 162/74 |
| 5,847,120 A | 12/1998 | Collins et al. | |
| 5,850,086 A | 12/1998 | Que, Jr. et al. | |
| 5,853,428 A | 12/1998 | Collins et al. | |
| 5,876,625 A | 3/1999 | Collins et al. | |
| 6,011,152 A | 1/2000 | Gordon-Wylie et al. | |
| 6,051,704 A | 4/2000 | Gordon-Wylie et al. | |
| 6,054,580 A | 4/2000 | Collins et al. | |
| 6,099,586 A | 8/2000 | Collins et al. | |
| 6,100,394 A | 8/2000 | Collins et al. | |
| 6,136,223 A | 10/2000 | Collins et al. | |
| 6,153,576 A | 11/2000 | Blum et al. | |
| 6,241,779 B1 | 6/2001 | Collins et al. | |
| 2001/0025695 A1 | 10/2001 | Patt et al. | |
| 2003/0168630 A1 | 9/2003 | Carina et al. | |
| 2004/0167329 A1 | 8/2004 | Horwitz et al. | |
| 2005/0187126 A1 | 8/2005 | Busch et al. | |
| 2006/0116281 A1 * | 6/2006 | Busch | B01J 31/182 502/103 |
| 2008/0190573 A1 | 8/2008 | Xu et al. | |
| 2009/0136597 A1 | 5/2009 | Martin | |
| 2010/0189630 A1 | 7/2010 | Martin | |
| 2018/0094384 A1 * | 4/2018 | Hage | D21C 9/14 |
| 2018/0186634 A1 * | 7/2018 | Hage | A01N 43/90 |

FOREIGN PATENT DOCUMENTS

| | | | |
|---|---|---|---|
| EP | 1001009 A1 | 5/2000 | |
| EP | 1008645 A1 | 6/2000 | |
| EP | 1835016 A1 | 9/2007 | |
| EP | 1835017 A1 | 9/2007 | |
| EP | 1837395 A2 | 9/2007 | |
| EP | 2228429 A1 | 9/2010 | |
| WO | 1994/05851 A1 | 3/1994 | |
| WO | 1995/34628 A1 | 12/1995 | |
| WO | 1997/48787 A1 | 12/1997 | |
| WO | 1998/39098 A1 | 9/1998 | |
| WO | 1999/64156 A1 | 12/1999 | |
| WO | 1999/65905 A1 | 12/1999 | |
| WO | 2000/12667 A1 | 3/2000 | |
| WO | 2000/60044 A1 | 10/2000 | |
| WO | 2001/05925 A1 | 1/2001 | |
| WO | 2001/064826 A2 | 9/2001 | |
| WO | 2001/85717 A1 | 11/2001 | |
| WO | 2002/02571 A1 | 1/2002 | |
| WO | 2002/48301 A1 | 6/2002 | |
| WO | 2002/077145 A1 | 10/2002 | |
| WO | 2003/104234 A1 | 12/2003 | |
| WO | 2003/104379 A1 | 12/2003 | |
| WO | 2004/076425 A1 | 9/2004 | |
| WO | 2005/049778 A1 | 6/2005 | |
| WO | 2006/125517 A1 | 11/2006 | |
| WO | 2008/003652 A1 | 1/2008 | |
| WO | 2011/128649 A1 | 10/2011 | |
| WO | 2011/137190 A1 | 11/2011 | |
| WO | 2011/141692 A1 | 11/2011 | |
| WO | 2012/027216 A1 | 3/2012 | |

OTHER PUBLICATIONS

Anderegg et al., Pyridinderivate als Komplexbildner VIII Die Herstellung je eines neuen vier- und sechszahnigen Liganden. Helvetica Chimica Acta. 1967;50(8):2330-2.

Aurangzeb et al., Structurally Diverse Manganese(III) Carboxylate Complexes of N2O2 Donor Set Symmetrical Schiff Base Ligands. J Chem Soc Chem Commun. 1994, pp. 2193-2195.

Bernal et al., Iron(II) complexes of polydentate aminopyridyl ligands and an exchangeable sixth ligand; reactions with peroxides. Crystal structure of [FeL1(H2O)][PF6]2-H2O [L1=N,N'-bis-(6-methyl-2-pyridylmethyl)-N,N'-bis(2-pyridylmethyl)ethane-1,2-diamine]. J Chem Soc Dalton Trans. 1995;22:3667-75.

Born et al., Catecholase activity of dicopper(II)-bispidine complexes: stabilities and structures of intermediates, kinetics and reaction mechanism. J Biol Inorg Chem. Jan. 2007;12(1):36-48.

Borzel et al., Iron coordination chemistry with tetra-, penta- and hexadentate bispidine-type ligands. Inorganica Chimica Acta. 2002;337:407-419.

Bu et al., A new tetraazamacrocycle functionalized with four pendant pyridyl groups: synthesis and crystal structure of the nickel(II) complex of 1,4,7,10-tetrakis(2-pyridylmethyl)-1,4,7,10-tetraazacyclododecane(L), [NiL]2+. Polyhedron. 1998;17(2-3):289-93.

Bu et al., Synthesis, characterization and crystal structures of the cobalt(II) and iron(II) complexes with an octadentate ligand, 1,4,7,10-tetrakis(2-pyridylmethyl)-1,4,7,10-tetraazacyclododecane (L), [ML]2+. Polyhedron. Feb. 2000;19(4):431-5.

Comba et al., Synthesis and characterisation of manganese(II) compounds with tetradentate ligands based on the bispidine backbone. J Chem Soc Dalton Trans. 1998, pp. 3997-4001.

Company et al., Olefin-dependent discrimination between two nonheme HO—FeV=O tautomeric species in catalytic H2O2 epoxidations. Chem Eur J. 2009;15(14):3359-62.

Costas et al., A synthetic model for the putative Fe(IV)(2)O(2) diamond core of methane monooxygenase intermediate Q. J Am Chem Soc. 2001;123:12931-2.

Dence, Pulp Bleaching, Principles and Practice. Tappi Press. pp. 133, 135, 137, 138, (1996).

Deroche et al., A Seven-Coordinate Manganese(II) Complex Formed wtih a Single Tripodal Heptadentate Ligand as a New Superoxide Scavenger. J Am Chem Soc. 1996;118:4567-73.

Ellis et al., Designing green oxidation catalysts for purifying environmental waters. J Am Chem Soc. Jul. 21, 2010;132(28):9774-81.

EPA, Alternative Disinfectants and Oxidants Guidance Manual. United States Environmental Protection Agency. Office of Water. 328 pages, Apr. 1999.

Fabian, The reactions of transition metal ions with chlorine(III). Coordination Chemistry Reviews. 2001;216-217:449-72.

Garcia-Bosch et al., Efficient and selective peracetic Acid epoxidation catalyzed by a robust manganese catalyst. Org Lett. Jun. 5, 2008;10(11):2095-8.

Glerup et al., Synthesis and Characterization of Bis(.mu.-oxo)dimanganese(III,III), -(III,IV), and -(IV,IV) Complexes with Ligands Related to N,N'-Bis(2-pyridylmethyl)-1,2-ethanediamine (Bispicen). Inorg Chem. 1994;33(18):4105-11.

(56) References Cited

OTHER PUBLICATIONS

Grau et al., Coordination equilibria between seven- and five-coordinate iron(II) complexes. Inorg Chem. Oct. 21, 2013;52(20):11867-74.
Hage et al., Applications of transition-metal catalysts to textile and wood-pulp bleaching. Angew Chem Int Ed Engl. 2006;45(2):206-22.
Hartman et al., Synthesis and characterization of (.mu.-hydroxo)bis(mu.-acetato)diiron(II) and (.mu.-oxo)bis(.mu.-acetato)diiron(III) 1,4,7-trimethyl-1,4,7-triazacyclononane complexes as models for binuclear iron centers in biology; properties of the mixed valence diiron(II,III) species. J Am Chem Soc. 1987;109(24):7387-96.
Hicks et al., Chlorite dismutation to chlorine dioxide catalyzed by a water-soluble manganese porphyrin. Angew Chem Int Ed Engl. Jan. 17, 2011;50(3):699-702.
Hicks et al., Non-heme manganese catalysts for on-demand production of chlorine dioxide in water and under mild conditions. J Am Chem Soc. Mar. 5, 2014;136(9):3680-6.
Hubin et al., New Iron(II) and Manganese(II) Complexes of Two Ultra-Rigid, Cross-Bridged Tetraazamacrocycles for Catalysis and Biomimicry. J Am Chem Soc. 2000;122(11):2512-22.
Jia et al., General-Acid-Catalyzed Reactions of Hypochlorous Acid and Acetyl Hypochlorite with Chlorite Ion. Inorg Chem. 2000;39:2614-20.
Kamp et al., A comparative mechanistic study of the oxidation of phenols in aqueous solution by oxomanganese(IV) and oxoiron(IV) 5,10,15,20-tetrakis(2-N-methylpyridyl) porphyrin. Journal of Molecular Catalysis A: Chemical. Nov. 1996;113(1-2)131-45.
Klopstra et al., Non-theme Iron Complexes for Stereoselective Oxidation: Tuning of the Selectivity in Dihydroxylation Using Different Solvents. Eur J Inorg Chem. 2004, pp. 846-856.
Kumar Chandra et al., Mono- and tetra-nuclear manganese(III) complexes of tripodal tris[2-(salicylideneamino) ethyl]amines. J Chem Soc Dalton Trans. 1993;6:863-9.
Morgenstern-Badarau et al., Amine conformational change and spin conversion induced by metal-assisted ligand oxidation: from the seven-coordinate iron(II)-TPAA complex to the two oxidized iron(II)-(py)3tren isomers. Characterization, crystal structures, and density functional study. Inorganica Chimica Acta. 2000;297:338-50.
Norman et al., (.mu.-Oxo)(mu.-carboxylato)diiron(III) complexes with distinct iron sites. Consequences of the inequivalence and its relevance to dinuclear iron-oxo proteins. J Am Chem Soc. 1990;112(4):1554-62.
Roelfes et al., Efficient DNA Cleavage with an Iron Complex without Added Reductant. J Am Chem Soc. 2000;122(46):11517-8.
Samhammer et al., Synthese, Stereochemie and analgetische Wirkung von 3,7-Diazabicyclo[3.3.1]nonan-9-onen und 1,3-Diazaadamantan-6-onen1). ArchPharm. 1989;322(9):551-5.
Schafer et al., Electronic Structure of Antiferromagnetically Coupled Dinuclear Manganese (MnIIIMnIV) Complexes Studied by Magnetic Resonance Techniques. J Am Chem Soc. 1998;120:13104-20.
Seo et al., [Mn(tmc)(O2)]+: a side-on peroxido manganese(III) complex bearing a non-heme ligand. Angew Chem Int Ed Engl. 2007;46(3):377-80.
Toftlund et al., Spin Equilibria in Octahedral Iron(II) Complexes with Some Hexadentate Ligands of the Tetrakis(2-pyridylmethyl)ethylene-diamine Type and a Spectral Correlation With Their Cobalt(III) and Nickel(II) Analogs. Acta Chemica Scandinavica A. 1981;35:575-85.
Tong et al., Preparation of N,N,N',N'-tetrakis-(2-benzimidazolyl-methyl)-1,2-ethanediamine and crystal assemblies of the relative complexes. Open Journal of Inorganic Chemistry. 2012;2:75-80.
Towle et al., Synthesis and characterization of the binuclear mixed valence complex di-μ-oxobis[tris(2-methyl-pyridyl) amine] dimanganese(II, IV) dithionate heptahydrate, [(tpa)MnO]2(S2O6)3/2·7H2O. Inorganica Chimica Acta. Jan. 15, 1988;141:167-8.
Umile et al., Catalytic generation of chlorine dioxide from chlorite using a water-soluble manganese porphyrin. Angew Chem Int Ed Engl. Jan. 17, 2011;50(3):695-8.
Umile et al., Dissection of the mechanism of manganese porphyrin-catalyzed chlorine dioxide generation. Inorg Chem. Oct. 17, 2011;50(20):10353-62.
Umile, Water-soluble, Cationic Manganese and Vanadium Porphyrins as Biomimetic Models and Practical Oxidation Catalysts. A dissertation presented to the faculty of Princeton University in candidacy for the degree of Doctor of Philosophy. 250 pages, Jun. 2012.
Vert et al., Terminology for biorelated polymers and applications (IUPAC Recommendations 2012). Pure Appl Chem. 2012;84(2):377-410.
Xu et al., Seven-Coordinate [ReVON4X2]+ Complexes (X ) O and Cl). Inorg Chem. 2000;39:5958-63.
Zdilla et al., Concerted dismutation of chlorite ion: water-soluble iron-porphyrins as first generation model complexes for chlorite dismutase. Inorg Chem. Mar. 2, 2009;48(5):2260-8.

\* cited by examiner

OXIDATIVE METHOD

CROSS-REFERENCE TO RELATED APPLICATIONS

This application is a continuation application, filed under 35 U.S.C. § 111(a), of International Application No. PCT/GB2016/051733, filed on Jun. 10, 2016 in English and designating the United States, published as WO 2016/198890 A1, which claims priority to European Patent Application No. 15171384.9, filed on Jun. 10, 2015. The entire contents of each of the above-referenced applications are incorporated herein by reference.

FIELD

The present invention relates to a method of generating chlorine dioxide from chlorite salts in the presence of a manganese ion-containing complex, a method of treating a substrate with a chlorine-containing oxidant in the presence of a manganese ion-containing complex and related aqueous media, kits and compositions.

BACKGROUND

The function of chlorine dioxide as an oxidant is useful for a variety of applications, such as for disinfection of, and removal of manganese and iron metals via formation of their oxides from, (surface) water, treatment of industrial water, such as in cooling towers, for taste and odour control, and for the bleaching of cellulosic substrates, particularly wood pulp. Besides significant usage in these applications, chlorine dioxide is also used in food processing, such as in the washing of fruit and vegetables, cleaning of animal processing equipment and animal carcasses, and treatment of poultry and animal habitats.

Chlorine dioxide serves as a highly selective oxidant owing to a unique one-electron transfer mechanism in which it is reduced to chlorite (see Alternative Disinfectants and Oxidants Guidance Manual, United States Environmental Protection Agency, 1999 (www.epa.gov/ogwdw/mdbp/alternative_disinfectants_guidance.pdf) in particular Chapter 4 thereof ("Chlorine Dioxide")).

A wide variety of transition metal-based bleaching complexes have been studied to enhance the bleaching or delignification activity of hydrogen peroxide on wood pulp. For example, dinuclear manganese complexes based on triazacyclononane ligands are known to be particularly active complexes. These complexes activate hydrogen peroxide towards the bleaching of cellulosic substrates, for example wood pulp or raw cotton (see for example EP 0 458 397 A2 (Unilever NV and Unilever plc), WO 2006/125517 A1 (Unilever plc et al.), US 2001/0025695 A1 (Patt et al.), WO 2011/128649 (Unilever plc et al.), and WO 2011/141692 (Unilever plc et al.)). For a detailed review of the different classes of bleaching complexes active with hydrogen peroxide or dioxygen, reference is made to R Hage and A Lienke, *Angew. Chem., Int. Ed. Engl.*, 45, 206-222 (2006).

Recently (see T P Umile & J T Groves (*Angew. Chem., Int. Ed. Engl.*, 50, 695-698 (2011)), T P Umile, D Wang & J T Groves (*Inorg. Chem.*, 50, 10353-10362 (2011)), WO 2012/027216 (The Trustees of Princeton University) and S D Hicks et al. (*Angew. Chem., Int. Ed. Engl.*, 50, 699-702 (2011)) it has been described that manganese complexes of porphyrins and porphyrazines can catalyse the formation of chlorine dioxide from sodium chlorite. In 2014, S D Hicks et al. (*J. Am. Chem. Soc.*, 136, 3680-3686 (2014)) described the use of manganese complexes of the pentadentate N,N-bis(pyridin-2-ylmethyl)bis(pyridin-2-yl)methylamine (N4Py) and N-benzyl-N,N',N'-tris(pyridin-2-ylmethyl)-1,2,-diaminoethane (Bn-TPEN) in the catalytic formation of chlorine dioxide from chlorite.

The extent of chlorite conversion into chlorine dioxide is dependent on the complex used and ranges from 16-60% for the Mn-porphyrins and 17-35% for the two N4Py- and Bn-TPEN-based manganese complexes (the variations resulted from using different test conditions).

In the publications concerning manganese complexes of porphyrins, porphyrazines, N4py and Bn-TPEN, it is suggested that the use of these may result in an alternative route for the production of chlorine dioxide from chlorite instead of using chlorate and a reducing agent. The latter process is the most common process to produce chlorine dioxide on large scale in, for example, pulp bleaching plants. For small-scale chlorine dioxide production, addition of a chemical oxidising agent (elemental chlorine, or hypochlorite+HCl) to chlorite solution, acidification of chlorite by HCl, or an electrochemical oxidation step is commonly employed.

There is no teaching in the publications concerning manganese complexes of porphyrins, porphyrazines, N4py and Bn-TPEN that these complexes could be of utility, in situ, in the bleaching and/or delignification of, for example, wood pulp or other cellulosic substrates by using chlorite salts or chlorine dioxide.

In U.S. Pat. No. 2,477,631 (Ecusta Paper Corporation) is described the use of high concentrations of cobalt, nickel and manganese salts in the bleaching of cellulosic materials using sodium chlorite under neutral or slightly acidic conditions.

Bleaching of raw cotton (cellulose) using chlorine dioxide is uncommon. This is because the optimal activity of chlorine dioxide is obtained at low pH whereas, for raw cotton, the most common method of removing fatty components from raw cotton, which is essential to obtain treated cotton suitable for subsequent dyeing processes, is conducted at high pH. Exposure of cotton to low pH only tends to take place when cotton needs to be desized (which term refers to the removal of the protective layers put on the fibers to circumvent mechanical damage when weaving into garments).

Chlorine dioxide causes gross physical damage to bacterial cells and viral capsids. The efficacy of chlorine dioxide is at least as good as that of elemental chlorine, with 2-4 log inactivation when using a few mgs/L of chlorine dioxide.

It is undesirable, for reasons of safety, to produce chlorine dioxide in a chemical plant, and then store and ship it to where it is to be consumed, for example in a pulp mill or water treatment facility. Typically, therefore, chlorine dioxide is produced next to its place of use by allowing sodium chlorate to react with an acid such as sulfuric acid and a reducing agent (such as hydrogen peroxide, sulfur dioxide or methanol). In pulp treatment, for example, the resultant gaseous chlorine dioxide is then brought to another vessel, trapped in water and used as such to the treat the pulp slurry.

Additional methods are known that produce chlorine dioxide from chlorite, either via acidification with hydrochloric acid or sulfuric acid, via oxidation of chlorite using chlorine, for example, or via electrochemical methods. Such processes are often used for small scale production of chlorine dioxide (for example in small units to deliver chlorine dioxide for hygiene/antimicrobial applications).

When chlorine dioxide acts as an oxidant, for example in its reaction with lignin moieties/residues during wood pulp and other bleaching processes, one-electron reactions occur, yielding the chlorite anion. Chlorite is not very reactive as an oxidant, in particular towards lignin or lignin residues, and may therefore be regarded as a waste product. Considering only the reduction of chlorine dioxide (oxidation state +4) to chlorite (oxidation state +3) means that only one electron per chlorine dioxide molecule is used (whilst in principle 5 electrons could be received by chlorine dioxide to yield chloride (oxidation state −1). Although other chlorine-containing oxidants may be generated (the chemistry is complicated), it is undeniable that the inherent oxidative efficiency of chlorine dioxide in existing processes is not being fully harnessed.

Although chlorine dioxide is of great benefit and is used in a variety of applications, it would be of benefit to the art to improve and/or develop alternative methods of using this chemical. This invention addresses that need.

SUMMARY

We have surprisingly found that manganese complexes structurally distinct from those described in the prior art are of utility in the preparation of chlorine dioxide from chlorite salts. Given that chlorite arises as a by-product upon the oxidation of substrates with chlorine dioxide, this finding has utility not only in the preparation of chlorine dioxide but also in allowing provision of alternative methods of treatment of various substrates with chlorine dioxide. Accordingly, use of the manganese ion-containing complexes and associated polydentate ligands described herein enhances the possibilities for using chlorite salts and chlorine dioxide.

Viewed from a first aspect, therefore, the invention provides a method of generating chlorine dioxide from a chlorine-containing chemical, which is a chlorite salt, comprising contacting, in an aqueous medium, a chlorite salt and a complex comprising one or more manganese ions and one or more polydentate ligands, which are either chelants capable of chelating at least one manganese ion through four nitrogen atoms or are Schiff-base ligands, with the proviso that the complex does not comprise a porphyrin or porphyrazine ligand.

Viewed from a second aspect, the invention provides a method of treating a substrate comprising contacting, in an aqueous medium, (i) the substrate (ii) an amount of a chlorine-containing chemical, which is chlorine dioxide and/or a chlorite salt; and (iii) a complex comprising one or more manganese ions and one or more polydentate ligands, which are either chelants capable of chelating at least one manganese ion through four nitrogen atoms or are Schiff-base ligands, with the proviso that the complex does not comprise a porphyrin or porphyrazine ligand.

Viewed from a third aspect, the invention provides an aqueous medium comprising a chlorine-containing chemical, which is chlorine dioxide and/or a chlorite salt, and a complex of one or more manganese ions and one or more polydentate ligands, which are either chelants capable of chelating at least one manganese ion through four nitrogen atoms or are Schiff-base ligands, with the proviso that the complex does not comprise a porphyrin or porphyrazine ligand.

Viewed from a fourth aspect, the invention provides a kit comprising a chlorite salt and, separately, one or more polydentate ligands, which are either chelants capable of chelating at least one manganese ion through four nitrogen atoms or one or more Schiff-base ligands, with the proviso that the one or more polydentate ligands are not porphyrin or porphyrazine ligands.

Viewed from a fifth aspect, the invention provides a composition comprising a chlorite salt and one or more polydentate ligands, which are either chelants capable of chelating at least one manganese ion through four nitrogen atoms or one or more Schiff-base ligands, with the proviso that the one or more polydentate ligands are not porphyrin or porphyrazine ligands.

The use of chlorine dioxide or chlorite salts according to the present invention in the context of wood pulp bleaching and/or delignification, involving use of the manganese ion-containing complexes described herein, allows better and/or more flexible use of these chemicals, and offers an alternative to existing methods, including those reliant on hydrogen peroxide. The invention is, however, not limited to the treatment of wood pulp. Other substrates, including cellulosic substrates such as raw cotton or stained cotton garments, may be treated in accordance with this invention, for example with detergent or other formulations comprising chlorine dioxide or solid chlorite salts and the complexes or polydentate ligands described herein. Such formulations may be used in cleaning and hygiene methods in lieu of formulations containing more traditional peroxy-based bleaches. As is discussed in more detail below, the invention is also of use in the treatment of water, for example to ameliorate microbial contamination, and other applications in which the antimicrobial effect of chlorine dioxide is of benefit.

Moreover, the invention permits alteration, e.g. improvement, of existing uses of the chlorine-based chemicals described herein (viz chlorine dioxide and chlorite salts), for example so as to allow a reduction in the temperature at which, or the duration for which, these chemicals are used. Furthermore, smaller dosages of chlorine dioxide or chlorite salts may be used than are used in the absence of the manganese complexes described herein, for example so as to obtain antimicrobial activity. Another advantage of the invention is that, for example, solid chlorite salts in conjunction with a manganese complex can be used for the antimicrobial applications, without needing to generate chlorine dioxide off line (i.e. ex situ).

Further aspects and embodiments of the invention will be evident from the discussion that follows below.

DETAILED DESCRIPTION

Figure 1:
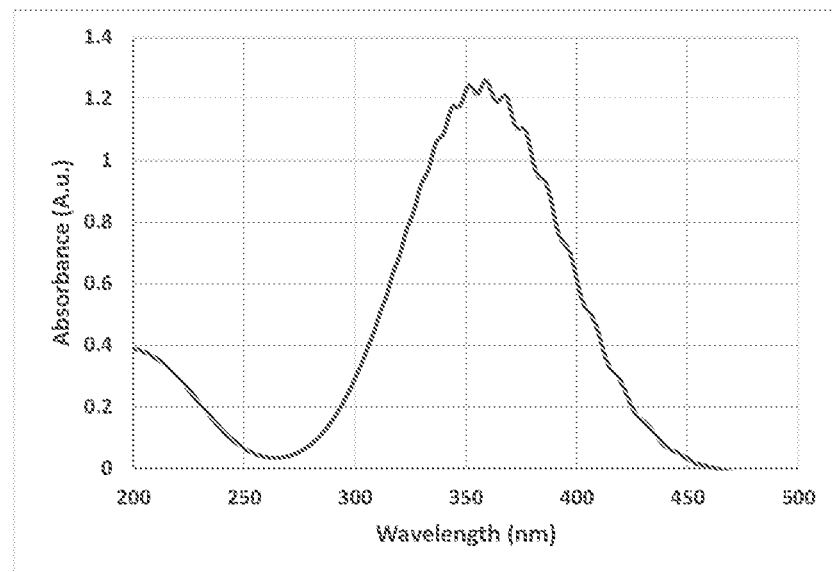
FIG. 1 depicts a UV-Vis spectrum of chlorine dioxide in water synthesised from chlorite as described in Experiment 1, at 20× dilution.

As summarised above, the present invention is based on the finding that complexes comprising manganese ions and either chelants capable of chelating at least one manganese ion through four nitrogen atoms or Schiff-base ligands can convert chlorite to chlorine dioxide and thereby offer improvements or alternative to existing methods and compositions used for chlorine dioxide-based oxidations.

The methods of the first and second aspect of the invention involve use of, and the composition of the third aspect of the invention comprises, an aqueous medium, which will generally have at least 1 wt % water, by which is meant that the water-containing liquid constituting the liquid aqueous medium comprises at least 1% by weight water, more typically at least 10 wt %, even more typically 25 wt %, and most typically at least 50 wt % water. Typically the aqueous medium will be a solution (i.e. in which its various components, such as chlorine dioxide or chlorite salt(s) and the manganese complex are dissolved). Although less typical, other aqueous (i.e. water-containing) media, including slurries and suspensions, may also be used as the aqueous medium. The aqueous medium comprises a liquid continuous phase, the liquid component of which is predominantly, i.e. between 50 and 100 wt % water, typically between 80 and 100 wt % water. Dependent on the use to which the aqueous medium referred to herein is being or is intended to be put, the liquid balance (if any) of the aqueous medium that is not water may be any convenient liquid, for example a liquid alcohol, e.g. a $C_{1-4}$ alcohol such as methanol or ethanol. Where present, additional liquids will typically be water-miscible. Although the liquid continuous phase will often be entirely water, it will be understood that this does not exclude the presence of small amounts of other liquids (e.g. in a total amount of less than about 10 wt %, more typically less than about 5 wt %), e.g. as contaminants in the other materials with which the liquid continuous phases are brought into contact.

The liquid continuous phase of the aqueous media described herein typically has a pH of between about 2 and about 11, for example a pH range of about 3 to about 7, for example a pH range of about 3.5 to about 7, often in the pH range of about 4 to about 6. Solutions or other systems having this pH may be readily prepared by the skilled person. For example, as the skilled person will recognise, appropriate buffers will allow control over pH to be achieved within the normal ability of those of normal skill. Suitable buffer systems include phosphate- or carboxylate-containing buffers, e.g. acetate-, benzoate- and citrate-based buffers. In some embodiments, the buffer system serves to achieve a pH between about 4.5 and about 5.5.

The chlorite salt used in accordance with the various aspects of the invention is typically an inorganic chlorite salt, the nature of which is not critical to the operation of the invention. One or more chlorite salts may be used in any given method although typically only one chlorite salt will be used. Non-limiting examples of chlorite salts that may be used include sodium chlorite ($NaClO_2$), potassium chlorite ($KClO_2$), lithium chlorite ($LiClO_2$), calcium chlorite ($Ca(ClO_2)_2$), barium chlorite ($Ba(ClO_2)_2$) and magnesium chlorite ($Mg(ClO_2)_2$). Typically sodium chlorite or potassium chlorite is used. More typically, the chlorite salt used is sodium chlorite.

As described above, the method according to the first aspect of the invention comprises contacting, in an aqueous medium, a chlorite salt and a complex comprising one or more manganese ions (which complexes are interchangeably referred to herein as manganese complexes) and one or more polydentate ligands (as defined herein). It will be understood that contacting may be achieved in a variety of ways. For example, an aqueous medium may be prepared, to which chlorite salt and metal complex are added, separately or in combination. The chlorite salt may be added as a solid, for example as a powder or granulate, or as an optionally buffered solution in water. Likewise, the manganese complex may be added as a solid, for example as a powder, crystal granulate, either on its own or, for example diluted with a salt. Alternatively, it may be added as an optionally buffered solution in water, or as a solution in an alternative solvent such as an alcohol. Where added as a solution, the solution is typically formed by dissolving the manganese complex in (optionally buffered) water. Alternatively, an aqueous medium (e.g. and typically a solution) containing a chlorite salt may be prepared to which may be added the manganese complex, or vice versa.

Further permutations are also possible and may be easily envisaged by the skilled person. For example, the manganese complex may not be added as such: manganese ions may be present in, or may be added to, an aqueous liquid and a manganese complex formed in situ by addition of an appropriate ligand. For example, aqueous mixtures comprising wood pulp may comprise sufficient quantities of manganese ions that useful quantities of the manganese complexes described herein can be generated in situ by addition of an appropriate amount of the polydentate ligands described herein.

Alternatively, in accordance with the fourth and fifth aspects of the invention, a kit or composition comprising both a polydentate ligand as defined herein and a chlorite salt may be provided from which the aqueous medium in accordance with the third aspect of the invention may be prepared. According to particular embodiments, the polydentate ligand in the kit or composition may be part of a manganese complex. However, it will be understood from the previous paragraph that this is not necessary, since the manganese complex may be made in situ by provision of an appropriate source of manganese ions.

Compositions in accordance with the fifth aspect of the invention, in particular those comprising a manganese complex, may be added to a liquid medium to form an aqueous medium in accordance with the third aspect of the invention, which may be used in accordance with the first and second aspects of the invention, for example in those embodiments of the second aspect of the invention described herein relating to the treatment of water.

Analogously, it will be understood that kits in accordance with the fourth aspect of the invention, in particular those comprising a manganese complex, may likewise be used to form an aqueous medium in accordance with the third aspect of the invention, which may be used in accordance with the first and second aspects of the invention, for example in those embodiments of the second aspect of the invention described herein relating to the treatment of water.

According to particular embodiments, the kit of the invention may take the form of a cartridge comprising separated compartments, for example of the type described in WO 2012/027216 A1 (supra), comprising the components of the kit, i.e. the chlorite salt and one or more polydentate ligands. For instance, in particular embodiments, the polydentate ligands within such kits, in particular when present in the form of a manganese complex, may be adsorbed (immobilised) on a solid support, permitting generation of chlorine dioxide by allowing water to flow through the cartridge. Advantageously, it will be understood that, where manganese complexes are immobilised in such systems, these may be reused upon replacement of the chlorite salt.

The aqueous medium used in accordance with the second aspect of the invention, and of the third aspect of the invention, may be similarly prepared to that used in accordance with the first aspect of the invention except that the aqueous medium may alternatively or additionally comprise chlorine dioxide.

Irrespective of how the aqueous media of the various aspects of the invention are prepared, the one or more chlorite salts in it are typically present at a concentration of between about 0.01 and about 50 mM, for example between about 1 and about 30 mM. Where an aqueous medium (for example for use in the first or second aspect of the invention or of the third aspect) is for use in the treatment of a cellulosic substrate, the one or more chlorite salts in it are often present at a concentration of between about 0.1 and about 50 mM, for example between about 5 and about 30 mM. It will of course be recognised that the skilled person will be able to employ an appropriate concentration of chlorite salt, as with concentrations/amounts of other components described herein, without undue burden.

As well as the chlorite salt, the aqueous media used in or of the various aspects of the invention comprise a manganese complex comprising one or more polydentate ligands, which are either chelants capable of chelating at least one manganese ion through four nitrogen atoms or are Schiff-base ligands, with the proviso that the complex does not comprise a porphyrin or porphyrazine ligand.

We use term porphyrin herein in accordance with its customary meaning in the art to mean a tetradentate tetracyclic macrocycle, comprising four pyrrole rings linked by four methine bridges, each of the pyrrole rings being connected at its 2- and 5-carbon atoms to an adjacent pyrrole moiety through a methine (=C(H)—) biradical. The parent compound is named porphyrine; when substituted, the resultant compounds are known as porphyrins.

Likewise, we use term porphyrazine herein in accordance with its customary meaning in the art to refer to a class of macrocycle related to porphyrins, but in which the four pyrrole rings are linked by —N=, rather than methine, bridges, with the parent compound being known as porphyrazine and its derivatives as porphyrazines. For the avoidance of doubt, will be understood that porphyrazine derivatives comprising cyclic moieties fused to the 3- and 4-carbon atoms of the pyrrole moieties within porphyrazine are porphyrazines.

According to particular embodiments, the polydentate ligand is not a tetrapyrrole-containing compound. By "tetrapyrrole-containing compound" is meant herein a compound comprising four pyrrole rings or reduced forms thereof (such as the pyrroline ring found in the chlorin ring of chlorophylls; a chlorin ring being made up of three pyrrole and one pyrroline (3,4-dihydropyrrole) moieties linked by four methine (—C(H)=) bridges, each of the pyrrole and pyrroline moieties being connected at its 2- and 5-carbon atoms to an adjacent pyrrole or pyrroline moiety through a methine biradical).

In addition to porphyrins and chlorins, there are a variety of other macrocyclic compounds based either on four pyrrole or reduced pyrrole units linked either through methine or imine (—N=) bridges. For example, corrin rings comprise four pyrroline moieties linked by three methine bridges, all but one of the pyrroline moieties being connected at their 2- and 5-carbon atoms to an adjacent pyrroline moiety through a methine biradical; two of the pyrroline moieties, however, are directly connected, from the 2-carbon of one to the 5-carbon atom of the other. Phthalocyanines are macrocycles comprising four pyrrole-based five-membered rings linked by four imine bridges, each of the five-membered rings having a benzene ring fused to the 3- and 4-positions of the five-membered ring, and each of the five-membered rings being connected at its 2- and 5-carbon atoms to an adjacent five-membered ring through an imine biradical.

According to those embodiments of the invention in which the polydentate ligand is not a tetrapyrrole-containing compound, each of these immediately aforementioned classes of macrocycle is excluded, it being understood that use of the term tetrapyrrole-containing compounds to embrace compounds not necessarily comprising four pyrrole rings is consistent with the use prevalent in the art to describe, as tetrapyrrole-containing compounds, compounds such as phthalocyanines and chlorins, even although these compounds, strictly speaking structurally, do not comprise four pyrrole rings.

By a chelant capable of chelating at least one manganese ion through four nitrogen atoms is meant a polydentate ligand capable of chelating one or more manganese ions by the formation of coordinate bonds between four nitrogen atoms of the chelant and a common manganese ion, chelation in this context and as the term is customarily used in the art requiring that four of the nitrogen atoms of the chelant coordinate to the same transition metal ion, in this case a manganese ion. The chelants are thus at least tetradentate. Some of the chelants described herein have a denticity of greater than four, however. For example, some of the chelants described herein are octadentate, capable of coordinating through eight nitrogen atoms. With these chelants, however, chelation is nevertheless still achieved by the formation of coordinate bonds between four nitrogen atoms and a common manganese ion: for example four of the eight nitrogen atoms in these octadentate chelants can chelate to a first manganese ion and four of these nitrogen atoms can chelate to a second manganese ion. This is generally achieved by such octadentate ligands having two portions of their structure giving rise to two separate regions of chelation, often separated by a bridge, as is explained and exemplified in greater detail below with reference to specific polydentate ligands useful in accordance with the present invention. For the avoidance of doubt, however, whilst the chelants described herein may have a denticity of greater than four, the phrase "chelant capable of chelating at least one manganese ion through four nitrogen atoms" does not permit chelation through five (or more) or three (or fewer) nitrogen atoms.

It will be understood that the term tetradentate refers to the number of metal ion-binding donor atoms that can bind to a metal ion. A chelant which is a tetradentate nitrogen donor thus refers to an organic molecule comprising four nitrogen atoms with lone pairs, which can bind to a common transition metal ion, which according to the present invention is a manganese ion. These nitrogen donor atoms may be either aliphatic, either tertiary, secondary or primary amines, or may belong to a heteroaromatic ring, for example pyridine.

Schiff-base ligands, for example of formulae (IX) and (X) defined below, belong to a wider class of molecules that comprise one or more non-aromatic carbon-nitrogen double bonds, also called imines, in which the nitrogen atom of the imine is connected to an aromatic or aliphatic group and the two carbon atoms are connected to aliphatic or aromatic groups, with the proviso that one of these carbon atoms may be hydrogen. By Schiff-based ligand, therefore, is meant imine-containing polydentate ligands. Typically, such ligands comprise two or three imine moieties. The nitrogen atoms of these imine moieties may bind to a manganese ion, optionally in conjunction with other donor atoms, for example together with the two or three phenol moieties depicted in formulae (IX) and (X) below. A wide variety of Schiff-base (i.e. imine-containing) ligands may be readily prepared by reaction of an aldehyde with a primary amine group.

According to particular embodiments, the chelant capable of chelating at least one manganese ion through four nitrogen atoms is of formulae (I) or (I-B):

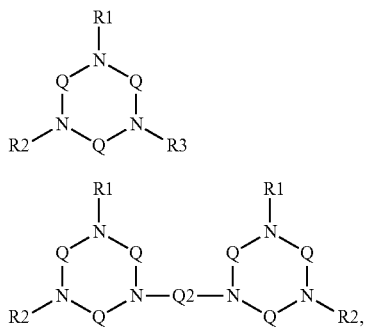

wherein:
each Q is independently selected from —CR4R5CR6R7— and —CR4R5CR6R7CR8R9—;
R4, R5, R6, R7, R8, and R9 are independently selected from: H, $C_1$-$C_4$alkyl and hydroxy$C_{1-4}$alkyl;
each R1 is independently selected from the group consisting of pyridin-2-ylmethyl, quinolin-2-ylmethyl, imidazol-2-ylmethyl, benzimidazol-2-ylmethyl, pyrazin-2-ylmethyl, pyrazol-1-ylmethyl, pyrazol-3-ylmethyl, 1,2,3-triazol-1-ylmethyl, 1,2,3-triazol-2-ylmethyl, 1,2,3-triazol-4-ylmethyl, 1,2,4-triazol-1-ylmethyl, 1,2,4-triazol-3-ylmethyl, thiazol-2-ylmethyl and $CH_2CH_2N(R10)(R11)$,
wherein N(R10)(R11) is selected from the group consisting of di($C_{1-44}$alkyl)amino; di($C_{6-10}$aryl)amino in which each of the aryl groups is independently optionally substituted with one or more $C_{1-20}$alkyl groups; di($C_{6-10}$aryl$C_{1-6}$alkyl)amino in which each of the aryl groups is independently optionally substituted with one or more $C_{1-20}$alkyl groups; NR7, in which R7 and the nitrogen atom N to which it is attached represent a heterocycloalkyl group optionally substituted with one or more $C_{1-20}$alkyl groups, which is connected to the remainder of R1 through the nitrogen atom N; di(heterocycloalkyl$C_{1-6}$alkyl)amino, in which each of the heterocycloalkyl groups is independently optionally substituted with one or more $C_{1-20}$alkyl groups; and di(heteroaryl$C_{1-6}$alkyl)amino, wherein each of the heteroaryl groups is independently optionally substituted with one or more $C_{1-20}$alkyl groups;
each R2 is independently selected from: hydrogen, $C_1$-$C_{24}$alkyl, $CH_2CH_2OH$, $CH_2COOH$ and $CH_2PO_3H_2$;
R3 is selected from the group consisting of H, $C_{1-24}$alkyl, $CH_2CH_2OH$, $CH_2COOH$ and $CH_2PO_3H_2$; and
Q2 is a bridge selected from the group consisting of a $C_{1-6}$alkylene moiety, a $C_{6-10}$arylene moiety or a moiety comprising one or two $C_{1-3}$alkylene units and one $C_{6-10}$arylene unit, which bridge may be optionally substituted one or more times with independently selected $C_{1-24}$alkyl groups and OH groups.

The following features, alone or in combination, as the context permits (i.e. where not conflicting) are typical (but not essential) features of the ligands of formulae (I) and (I-B):

where a ligand is of formula (I-B), the ligand is symmetrical, i.e. each R1 is the same and each R2 is the same; and each Q group at the same position (e.g. between the bridging moiety-bearing and R2-substituted nitrogen atoms) in each ring is the same;
each Q is the same, for example each Q is —CR4R5CR6R7—, in which R4, R5, R6 and R7 are often H, which limitation defines the class of ligands often known as 1,4,7-triazacyclononane ligands;
R1 is often pyridin-2-ylmethyl or quinolin-2-ylmethyl, often pyridin-2-ylmethyl;
alternatively, —R1 may be —$CH_2CH_2N(R10)(R11)$ in which any R10 and/or R11 moiety referred to as being optionally substituted with one or more $C_{1-20}$alkyl groups is typically either unsubstituted or only substituted with one $C_{1-20}$alkyl group;
where R1 is $CH_2CH_2N(R10R11)$, non-limiting examples of such groups include: di(p-methylbenzyl)amino, as an example of a di($C_{6-10}$aryl$C_{1-4}$alkyl)amino; pyrrolidinyl, piperidinyl or morpholinyl, as examples of NR7; di(piperidinylethyl)amino, as an example of di(heterocycloalkyl$C_{1-6}$alkyl)amino; and di(pyridin-2-ylethyl)amino, as an example of a di(heteroaryl$C_{1-6}$alkyl)amino.
Typically, if present, each —N(R10)(R11) is independently selected from the group consisting of —$NMe_2$, —$NEt_2$, —$N(i-Pr)_2$,

R2 is $C_1$-$C_{24}$alkyl, more typically a $C_1$-$C_6$alkyl, and often methyl;
R3 is $C_1$-$C_{24}$alkyl, more typically a $C_1$-$C_6$alkyl, and often methyl and is typically the same as R2;
for ligands of formula (I-B), bridge Q2 is typically $C_{1-6}$alkylene, often ethylene or n-propylene, and most often ethylene.

According to particular embodiments of the invention, ligands of formula (I) are selected from the group consisting of 1-(pyridin-2-ylmethyl)-4,7-dimethyl-1,4,7-triazacyclononane, 1,2-bis(4-methyl-7-pyridin-2-yl-1,4,7-triazacyclonon-1-yl)-ethane and 1,3-bis(4-methyl-7-pyridin-2-yl-1,4,7-triazacyclonon-1-yl)-propane. According to particular embodiments, the ligand where of formula (I) is 1-(pyridin-2-ylmethyl)-4,7-dimethyl-1,4,7-triazacyclononane.

According to further embodiments, the chelant capable of chelating at least one manganese ion through four nitrogen atoms is of formulae (II) or (III):

wherein:
each —Q— is independently selected from —N(R)C($R_1$)($R_2$)C($R_3$)($R_4$)— and —N(R)C($R_1$)($R_2$)C($R_3$)($R_4$)C($R_5$)($R_6$)—;

each —Q1— is independently selected from —N(R')C(R$_1$)(R$_2$)C(R$_3$)(R$_4$)— and —N(R')C(R$_1$)(R$_2$)C(R$_3$)(R$_4$)C(R$_5$)(R$_6$)—;

each R is independently selected from: hydrogen or is selected from the group consisting of C$_1$-C$_{20}$alkyl, C$_2$-C$_{20}$alkenyl, C$_2$-C$_{20}$alkynyl, C$_6$-C$_{10}$aryl and C$_7$-C$_{20}$arylalkyl, each of which may be optionally substituted with C$_1$-C$_6$alkyl;

the two —R' groups of the two Q1 groups together form bridging moiety —Q2—; Q2 is a bridge selected from the group consisting of a C$_{2-6}$alkylene moiety, a C$_{6-10}$arylene moiety, or a moiety comprising one or two C$_1$-C$_3$alkylene units and one C$_6$-C$_{10}$arylene unit, which bridge may be optionally substituted one or more times with independently selected C$_{1-24}$alkyl groups; and R$_1$-R$_6$ are each independently selected from: H, C$_{1-4}$alkyl and hydroxyC$_{1-4}$alkyl.

The following features, alone or in combination, as the context permits (i.e. where not conflicting) are typical (but not essential) features of the ligands of formulae (II) and (III):

Q2, which may be present in chelants of formula (II), is an ethylene or n-propylene bridge;

each —Q— is independently selected from —N(R)(CH$_2$)$_2$— and —N(R)(CH$_2$)$_3$—;

each —Q1— is independently selected from —N(R')(CH$_2$)$_2$— and —N(R')(CH$_2$)$_3$—;

each R is each selected from: hydrogen, C$_1$-C$_{20}$alkyl and C$_6$-C$_{10}$aryl, more typically hydrogen, a C$_1$-C$_{20}$alkyl group, a C$_6$-C$_{10}$aryl group or a C$_7$-C$_{20}$arylalkyl group, more typically still hydrogen, methyl, ethyl, or benzyl;

R$_1$-R$_6$ are each typically hydrogen or C$_{1-4}$alkyl, more typically still hydrogen or methyl, for example hydrogen;

groups having the same descriptor, e.g. R, R$_1$, Q1 etc, are typically the same; and the ligand is of formula (II-A), i.e. a cross-bridged tetraaza-1,4,8,11-cyclotetradecane ligand:

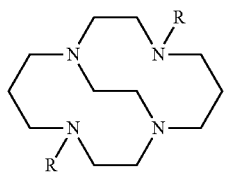

(II-A)

wherein R is as defined for formulae (II) and (III) above, including the particular embodiments immediately hereinbefore described.

Typically each R in formula (II-A) is independently selected from the group consisting of methyl, ethyl and benzyl. Typically, each R is the same, often methyl. Other suitable cross-bridged ligands (so-called because of the presence of a bridge linking two non-adjacent nitrogen atoms of the tetrazacycloalkane) are described in WO 98/39098 A1 (The University of Kansas).

Typical ligands of formula (III) are tetraaza-1,4,7,10-cyclododecane and tetraaza-1,4,8,11-cyclotetradecane, in either of which each of the hydrogen atoms attached to the four nitrogen atoms may be independently substituted for a C$_1$-C$_{20}$alkyl, C$_6$-C$_{10}$aryl or a C$_7$-C$_{20}$arylalkyl group. According to particular embodiments, ligands of formula (III) may be tetraaza-1,4,7,10-cyclododecane-based and tetraaza-1,4,8,11-cyclotetradecane-based ligands of formula (III) wherein each R group is hydrogen or C$_{1-20}$alkyl. Within these ligands, R is typically hydrogen or methyl. According to particular embodiments, ligands of formula (III) include 1,4,7,10-tetraazacyclododecane, 1,4,7,10-tetramethyl-1,4,7,10-tetraazacyclododecane, 1,4,8,11-tetraazacyclotetradecane and 1,4,8,11-tetramethyl-1,4,8,11-tetraazacyclotetradecane.

According to further embodiments, the chelant capable of chelating at least one manganese ion through four nitrogen atoms is of formula (IV):

$$N(CY_2\text{—R1})_3 \qquad (IV)$$

wherein:

each —R1 is independently selected from —CY$_2$N(C$_1$-C$_{24}$alkyl)$_2$; —CY$_2$NR7, in which R7 and the nitrogen atom N to which it is attached represent a heterocycloalkyl group optionally substituted with one or more C$_{1-6}$alkyl groups, which is connected to the remainder of R1 through the nitrogen atom N; or represents an optionally C$_1$-C$_6$alkyl-substituted heteroaryl group selected from pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl; and each Y is independently selected from H, CH$_3$, C$_2$H$_5$, C$_3$H$_7$.

The following features, alone or in combination, as the context permits (i.e. where not conflicting) are typical (but not essential) features of the ligands of formula (IV):

each Y is H;

—R1 is selected from —CH$_2$N(C$_1$-C$_{24}$alkyl)$_2$ and —CH$_2$NR7, with particular embodiments being those in which the nitrogen-containing group attached to the methylene group recited for these possibilities is selected from the group consisting of —NMe$_2$, —NEt$_2$, —N(i-Pr)$_2$,

each R1 is often optionally substituted pyridin-2-yl; and each R1 is often unsubstituted pyridin-2-yl.

According to a specific embodiment, the ligand of formula (IV) is N,N,N-tris(pyridin-2-yl-methyl)amine (TPA), which has, for example, been described in U.S. Pat. No. 5,850,086 (Que, Jr. et al.) and U.S. Pat. No. 6,153,576 (Blum et al.).

According to further embodiments, the chelant capable of chelating at least one manganese ion through four nitrogen atoms is of formulae (V), (V-B) or (V-C):

(V)

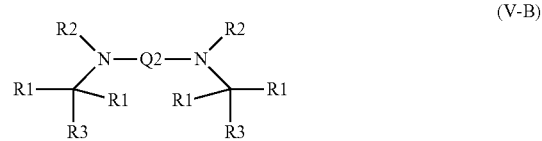

(V-B)

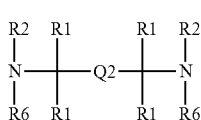

(V-C)

—R4— is —CH$_2$—.

where an alkyl-substituted heteroaryl group, R5 is optionally substituted pyridin-2-yl, with the unsubstituted pyridin-2-yl being most typical;

According to other particular embodiments, —R5 may be —CH$_2$N(C$_1$-C$_{24}$alkyl)$_2$ or —CH$_2$NR7, the nitrogen-containing group attached to the methylene group recited for these possibilities being selected from the group consisting of NMe$_2$, NEt$_2$, N(i-Pr)$_2$,

each R3 and each R6 each independently represents hydrogen, or a group selected from C$_1$-C$_6$alkyl, C$_6$-C$_{10}$aryl and C$_6$-C$_{10}$arylC$_1$-C$_6$alkyl, each of which groups may be optionally C$_1$-C$_6$alkyl-substituted;

each R3 is selected from hydrogen, methyl and benzyl;

Q2 is selected from —CH$_2$CH$_2$—, —CH$_2$CH$_2$CH$_2$— and —CH$_2$CHOHCH$_2$—, each of which is optionally C$_1$-C$_6$alkyl-substituted, with the bridge typically being unsubstituted; and each R6 is typically selected from hydrogen, methyl, and benzyl, with R6 most typically being methyl.

According to particular embodiments, the ligand of formula (V) is N-methyl-N-(pyridin-2-yl-methyl)-bis(pyridin-2-yl)methylamine (MeN3Py) or N-benzyl-N-(pyridin-2-yl-methyl)-bis(pyridin-2-yl)methylamine (BzN3Py), both which are disclosed by Klopstra et al. (*Eur. J. Inorg. Chem.*, 4, 846-856 (2006). Additional examples of ligands of formula (V) include: N-methyl-N-(pyridin-2-yl-methyl-1,1-bis(pyridin-2-yl)-1-aminoethane, N-benzyl-N-(pyridin-2-yl-methyl-1,1-bis(pyridin-2-yl)-1-aminoethane), N-methyl-N-(pyridin-2-yl-methyl-1,1-bis(pyridin-2-yl)-2-phenyl-1-aminoethane and N-benzyl-N-(pyridin-2-yl-methyl-1,1-bis(pyridin-2-yl)-2-phenyl-1-aminoethane.

According to further embodiments, the chelant capable of chelating at least one manganese ion through four nitrogen atoms is of formulae (VI) and (VI-B):

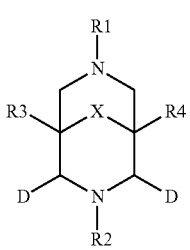

(VI)

wherein:
each —R1 independently is selected from —CH$_2$N(C$_1$-C$_{24}$alkyl)$_2$, —CH$_2$NR7 or an optionally C$_1$-C$_6$alkyl-substituted heteroaryl group selected from pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl);

each —R2 independently represents —R4—R5;

each —R3 and each —R6 each independently represents hydrogen, or a group selected from C$_1$-C$_6$alkyl, C$_6$-C$_{10}$aryl, C$_5$-C$_{10}$heteroaryl, C$_6$-C$_{10}$arylC$_1$-C$_6$alkyl and C$_5$-C$_{10}$heteroarylC$_1$-C$_6$alkyl, each of which group may be optionally C$_1$-C$_6$alkyl-substituted, with the proviso that no —R3 or —R6 may be one of the possibilities permitted for —R1;

each —R4— independently represents optionally C$_1$-C$_6$alkyl-substituted C$_1$-C$_6$alkylene;

each —R5 independently represents an —CH$_2$N(C$_1$-C$_{24}$alkyl)$_2$ group, —CH$_2$NR7 or an optionally C$_1$-C$_6$alkyl-substituted heteroaryl group selected from the group consisting of pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl; each —NR7 independently represents a moiety in which R7 and the nitrogen atom N to which it is attached represent a heterocycloalkyl group optionally substituted with one or more C$_{1-20}$alkyl groups, which is connected to R4 through the nitrogen atom N; and Q2 represents a bridge selected from the group consisting of a C$_{1-6}$alkylene moiety C$_{6-10}$arylene moiety or a moiety comprising one or two C$_{1-3}$alkylene units and one C$_{6-10}$arylene unit, which bridge is optionally substituted one or more times with independently selected C$_{1-24}$alkyl groups and OH groups.

It will be understood that ligands of formulae (V-B) and (V-C) are effectively dimers of ligands of formula (V) in which bridge Q2 takes the place of the R6 groups, or the R3 groups respectively. Of the ligands of formulae (V), (V-B) and (V-C), ligands of formula (V) are most typical. Amongst the bridge-containing ligands, ligands of formula (V-B) more typical than ligands of formula (V-C). Additionally, the following features, alone or in combination, as the context permits (i.e. where not conflicting) are typical (but not essential) features of the ligands of formulae (V), (V-B) and (V-C):

groups having the same descriptor, e.g. R1, R2 (and, within the definition of R2, R4 and R5), R3, R6 and Q2 etc, are the same;

R1 is optionally substituted pyridin-2-yl, in particular unsubstituted pyridin-2-yl;

In embodiments in which —R1 is selected from —CH$_2$N(C$_1$-C$_{24}$alkyl)$_2$ and —CH$_2$NR7, the nitrogen-containing group attached to the methylene group recited for these possibilities is selected from the group consisting of —NMe$_2$, —NEt$_2$, —N(i-Pr)$_2$, -continued

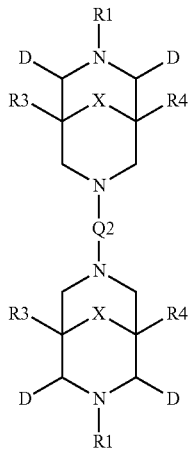

(VI-B)

wherein:

each D is independently selected from the group consisting of pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl, each of which may be optionally substituted by one or more groups independently selected from the group consisting of —F, —Cl, —Br, —OH, —$OC_1$-$C_4$alkyl, —NH—CO—H, —NH—CO—$C_1$-$C_4$alkyl, —$NH_2$, —NH—$C_1$-$C_4$alkyl, and —$C_1$-$C_4$alkyl;

the or each R1 and R2 are independently selected from the group consisting of $C_1$-$C_{24}$alkyl, $C_{6-10}$aryl, and $C_6$-$C_{10}$aryl$C_1$-$C_{24}$alkyl, each of which may be optionally substituted by one or more groups selected from —F, —Cl, —Br, —OH, —$OC_1$-$C_4$alkyl, —NH—CO—H, —NH—CO—$C_1$-$C_4$alkyl, —$NH_2$, —NH—$C_1$-$C_4$alkyl, and —$SC_1$-$C_4$alkyl;

R3 and R4 are independently selected from hydrogen, $C_1$-$C_8$alkyl, $C_1$-$C_8$alkyl-O—$C_1$-$C_8$alkyl, $C_6$-$C_{10}$aryloxy$C_1$-$C_8$alkyl, $C_6$-$C_{10}$aryl, hydroxy$C_1$-$C_8$alkyl and —$(CH_2)_{0-4}$C(O)OR5 wherein R5 is independently selected from: hydrogen, $C_1$-$C_8$alkyl and $C_{6-10}$aryl;

Q2 represents a bridge selected from the group consisting of a $C_{1-6}$alkylene moiety, a $C_{6-10}$arylene moiety or a moiety comprising one or two $C_{1-3}$alkylene units and one $C_{6-10}$arylene unit, which bridge is optionally substituted one or more times with independently selected $C_{1-24}$alkyl groups and OH groups; and X is selected from C=O, —$[C(R6)_2]_{0-3}$— wherein each R6 is independently selected from hydrogen, hydroxyl, $C_1$-$C_4$alkoxy and $C_1$-$C_4$alkyl.

Such ligands (i.e. of formula (VI) and (VI-B)) are known in the art as bispidons. The following features, alone or in combination, as the context permits (i.e. where not conflicting) are typical (but not essential) features of bispidons:

each D group is either unsubstituted or substituted with one or more, often one, $C_1$-$C_4$alkyl groups;
each D group is the same;
each D group is an optionally substituted pyridin-2-yl;
each D group is unsubstituted pyridin-2-yl group;
Q2 is selected from —$CH_2CH_2$—, —$CH_2CH_2CH_2$— and —$CH_2CHOHCH_2$—, each of which is optionally $C_1$-$C_6$alkyl-substituted, with the bridge typically being unsubstituted;

each R1 and R2 group is independently selected from $C_1$-$C_{24}$alkyl and $C_6$-$C_{10}$aryl$C_1$-$C_{12}$alkyl, more typically independently selected from $C_1$-$C_{15}$alkyl and $C_6$-$C_{10}$aryl$C_1$-$C_6$alkyl, and even more typically independently selected from: $C_1$-$C_8$alkyl and $C_6$-$C_{10}$aryl$CH_2$;
groups R1 and R2 are the same;
R1=R2=$CH_3$; and
groups R3 and R4 are the same.

According to specific embodiments, the bispidon is one of the following ligands: dimethyl 2,4-di-(2-pyridyl)-3,7-dimethyl-3,7-diaza-bicyclo[3.3.1]nonan-9-one-1,5-dicarboxylate (N2py2); dimethyl 2,4-di-(2-pyridyl)-3,7-dibutyl-3,7-diaza-bicyclo[3.3.1]nonan-9-one-1,5-dicarboxylate; dimethyl 2,4-di-(2-pyridyl)-3,7-dioctyl-3,7-diaza-bicyclo[3.3.1]nonan-9-one-1,5-dicarboxylate; and dimethyl 2,4-di-(2-pyridyl)-3,7-dibenzyl-3,7-diaza-bicyclo[3.3.1]nonan-9-one-1,5-dicarboxylate. N2py2 and various manganese complexes made with this ligand have been described by P. Comba et al. (*J. Chem. Soc., Dalton Trans*, 3997-4002 (1998)).

According to further embodiments, the chelant capable of chelating at least one manganese ion through four nitrogen atoms is of formulae (VII) or (VII-B):

$$R1R2N—X—NR1R2 \quad (VII);$$

and $$R1R2N—X-NR2-Q2-R2N—X—NR1R2 \quad (VII\text{-}B);$$

wherein:

—X— is selected from —$CY_2CY_2$—, cis- or trans-1,2-cyclohexylene, —$CY_2CY_2CY_2$—, —$CY_2C(OH)YCY_2$—, with each Y being independently selected from H, $CH_3$, $C_2H_5$ and $C_3H_7$;

each R1 group is independently an alkyl, heterocycloalkyl, heteroaryl, aryl, arylalkyl or heteroarylalkyl group, each of which may be optionally substituted with a substituent selected from the group consisting of hydroxy, alkoxy, phenoxy, phosphonate, carboxylate, carboxamide, carboxylic ester, sulfonate, amine, mono- or dialkylamine and $N^+(R3)_3$, wherein R3 is selected from hydrogen, alkyl, alkenyl, arylalkyl, arylalkenyl, hydroxyalkyl, aminoalkyl, and alkyl ether, with the proviso that no R1 may be one of the possibilities permitted for R2;

each —R2 group is independently —$CZ_2$—R4, with each Z being independently selected from H, $CH_3$, $C_2H_5$, $C_3H_7$; and each —R4 being independently selected from optionally substituted —$N(C_1$-$C_{24}$alkyl$)_2$; —NR7, wherein each —NR7 independently represents a moiety in which R7 and the nitrogen atom N to which it is attached represent a heterocycloalkyl group optionally substituted with one or more $C_{1-6}$alkyl groups, which is connected to $CZ_2$ through the nitrogen atom N; and an optionally $C_1$-$C_6$alkyl-substituted heteroaryl group selected from the group consisting of pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl; and Q2 is a bridge selected from the group consisting of a $C_{1-6}$alkylene bridge, a $C_{6-10}$arylene bridge or a bridge comprising one or two $C_{1-3}$alkylene units and one $C_{6-10}$ arylene unit, which bridge may be optionally substituted one or more times with independently selected $C_{1-24}$alkyl groups and OH groups.

The following features, alone or in combination, as the context permits (i.e. where not conflicting) are typical (but not essential) features of the ligands of formulae (VII) and (VII-B):

each Y is typically H;
X is typically —CH$_2$CH$_2$— or 1,2-cyclohexylene;
Q2 is typically an ethylene or n-propylene bridge;
each Z is typically hydrogen;
where —R4 is —NR7 or —N(C$_1$-C$_{24}$alkyl)$_2$, this is selected from the group consisting of NMe$_2$, —NEt$_2$, —N(i-Pr)$_2$,

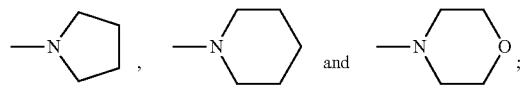

often, two R4 groups (or four R4 groups in ligands of formula (VII-B) are selected from pyridin-2-yl, imidazol-2-yl, imidazol-4-yl, or benzimidazol-2-yl (each of which may be optionally C$_1$-C$_6$alkyl-substituted), particularly wherein Z is hydrogen, more typically optionally substituted pyridin-2-yl wherein Z is hydrogen, and most typically unsubstituted pyridin-2-yl wherein Z is hydrogen (i.e. two R2 groups (four in ligands of formula (VII-B) are pyridin-2-ylmethyl); and/or two R1 groups are independently optionally substituted C$_1$-C$_{24}$ alkyl groups, more typically unsubstituted C$_1$-C$_{24}$ alkyl groups, for example C$_1$-C$_{18}$ alkyl groups, such as wherein two R1 groups are each methyl; and
each R1 group is independently an alkyl, aryl or arylalkyl group, each of which may be optionally substituted with a substituent selected from the group consisting of hydroxy, alkoxy, phenoxy, phosphonate, carboxylate, carboxamide, carboxylic ester, sulfonate, amine, mono- or dialkylamine and N$^+$(R3)$_3$, wherein R3 is selected from hydrogen, alkyl, alkenyl, arylalkyl, arylalkenyl, hydroxyalkyl, aminoalkyl, and alkyl ether.

Specific embodiments of ligands of formula (VII) are N,N'-dimethyl-N,N'-bis(pyridin-2-ylmethyl)ethylene-1-2-diamine and N,N'-dimethyl-N,N'-bis(pyridin-2-ylmethyl)-cyclohexane-1-2-diamine, as disclosed by J Glerup et al. (*Inorg. Chem.*, 33, 4105-4111 (1994)).

According to further embodiments, the chelant capable of chelating at least one manganese ion through four nitrogen atoms is of formulae (VIII) or (VIII-B):

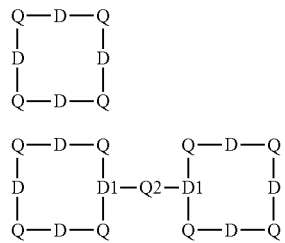

wherein:
each Q group independently represents —CY$_2$— or —CY$_2$CY$_2$—, in which each Y is independently selected from hydrogen, C$_{1-24}$alkyl, or a C$_{6-10}$aryl;
each D group independently represents a heteroarylene group or a group of the formula —NR—, with the proviso that at least one D group represents a heteroarylene group;
each D1 group represents a group of the formula —NR'—;
the two —R' groups of the two D1 groups together form bridging moiety —Q2—;
Q2 is a bridge selected from the group consisting of a C$_{1-6}$alkylene moiety, a C$_{6-10}$arylene moiety, or a moiety comprising one or two C$_1$-C$_3$alkylene units and one C$_6$-C$_{10}$arylene unit, which bridge may be optionally substituted one or more times with independently selected C$_{1-24}$alkyl groups and OH groups; and each R group independently represents H, C$_{1-24}$alkyl, C$_{6-10}$aryl or C$_{5-10}$heteroaryl.

The following features, alone or in combination, as the context permits (i.e. where not conflicting) are typical (but not essential) features of the ligands of formulae (VIII) and (VIII-B):

each R is typically independently selected from hydrogen or methyl;
where a bridge Q2 is present, this is typically an ethylene or n-propylene bridge;
each R group is typically the same;
each Q is typically —CY$_2$—;
Y is typically hydrogen and thus each Q is typically —CH$_2$—; and
where a group D is heteroarylene, this is typically pyridylene, in particular pyridin-2,6-diyl.

According to particular embodiments, ligands of formula (VIII) are of formula (VIII-A), in which wherein R is as defined for formulae (VIII) and (VIII-B), including the particular embodiments immediately hereinbefore described:

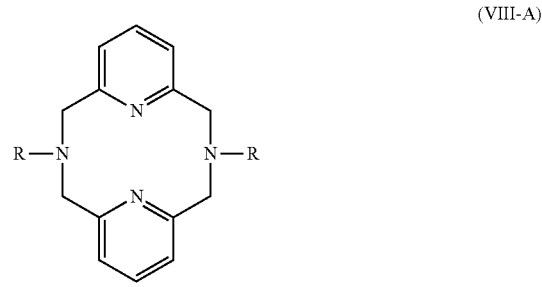

According to specific embodiments, ligands of formula (VIII) (and formula (VIII-A)) are selected from 2,11-diaza[3.3](2,6-pyridinophane) (a compound of formula (VIII-A) in which each R is hydrogen) and N,N'-dimethyl-2,11-diaza[3.3](2,6-pyridinophane) (a compound of formula (VIII-A) in which each R is methyl), as described in WO 99/065905 A1 (Unilever plc et al.).

It will be understood that, in the polydentate ligands of formulae (I-B), (V-B), (V-C), (VI-B), (VII-B) and (VIII-B), each of which comprises a bridge, the resultant polydentate ligands are capable of chelating two manganese ions. As with the other polydentate ligands described herein, such polydentate ligands may be readily accessed by the skilled person.

For example, with regard to ligands of formulae (I-B), reference is made to the procedure described by K-O Schaefer et al. (*J. Am. Chem. Soc.*, 120, 131040-13120 (1998)), describing the synthesis of bridged triazacyclononane (TACN) compounds.

With regard to ligands of formulae (V-B), the skilled person will recognise, for example, that N-(pyridin-2-ylmethyl)-bis(pyridin-2-yl)methylamine (N3py) (the synthesis of which is described by G. Roelfes et al. (*J. Am. Chem. Soc.*, 122, 11517-11518 (2000)), may be reacted with, 1,2-dibromoethane, for example to yield 1,2-bis(N-(pyridin-2-yl-methyl)-bis(pyridin-2-yl)methylamine)-ethane, analogously to the synthesis of the TACN-bridged ligands described by K-O Schaefer et al. (supra) or the procedure described by M Klopstra et al. (*Eur. J. Inorg. Chem.*, 846-856 (2000)) involving reaction N3py with benzylchloride to produce benzyl-N3py.

With regard to ligands of formulae (V-C), the skilled person will recognise, for example, that N-methyl-N-(pyridin-2-yl-methyl)-bis(pyridin-2-yl)methylamine (MeN3py) (the synthesis of which is described by M Klopstra et al. (supra) may be reacted with BuLi at low temperature and then with, for example, dibromoethane to yield the bridged ligand, analogously to the synthesis of MeN4py and benzylN4py described elsewhere (see for example EP0909809B).

With regard to ligands of formula (VI-B), the skilled person will recognise that, for example, if Q2=1,3-propylene ($CH_2CH_2CH_2$), by reacting the appropriate piperidone precursor, formaldehyde and 1,3-diamino-propane, the desired bridged bispidon ligand can be obtained, as described by K. Born et al. (*J. Biol. Inorg. Chem.*, 12, 36-48 (2007)).

With regard to ligands of formulae (VII-B), the skilled person will recognise, for example that N,N'-bis(2-pyridylmethyl)ethylene diamine (prepared as described by L Xu et al (*Inorg. Chem.*, 39, 5958-5963 (2000)) can be reacted with, for example, 1,3-dibromopropane (analogously to the synthesis of the TACN-bridged ligands described by K-O Schaefer et al. (supra)), to yield 1,3-bis(N,N'-bis(2-pyridylmethyl)ethylene diamine)-propane. Subsequently, methylation can be effected to access the methylated ligand, 1,3-bis(N,N'-dimethyl-N,N'-bis(2-pyridylmethyl)ethylene diamine)-propane, analogously to synthesis of MeN3py by M Klopstra et al. (supra).

With regard to ligands of formulae (VIII-B), the skilled person will recognise, for example that 2,11-diaza[3.3](2,6-pyridinophane (see WO 99/065905 A1) can be reacted with 1,2-dibromoethane (analogously to the synthesis of the TACN-bridged ligands described by K-O Schaefer et al. (supra)), to yield 1,2-bis(2,11-diaza[3.3](2,6-pyridinophane) ethane. Subsequently, methylation can be effected to access the methylated ligand, 1,2-bis(11-methyl-2,11-diaza[3.3](2,6-pyridinophane)ethane, analogously to synthesis of MeN3py by M Klopstra et al. (supra).

It will be understood that the procedures outlined above can be adapted to access other polydentate ligands of formulae (I-B), (V-B), (V-C), (VI-B), (VII-B) and (VIII-B) within the normal ability of those of skill in the art and that alternative synthetic procedures will be readily evident to the skilled person.

Notwithstanding the discussion of polydentate ligands of formulae (I-B), (V-B), (V-C), (VI-B), (VII-B) and (VIII-B), however, the polydentate ligands of the invention are often capable of chelating one manganese ion and thus, of the chelants described above, chelants selected from the group consisting of ligands of formula (I), (II) including (II-A), (III), (IV), (V), (VI), (VII) and (VIII) including (VIII-A) are typical.

Another class of ligands is the class of so-called Schiff-base ligands. According to particular embodiments, the Schiff-base ligand of the following formula (IX) and (X):

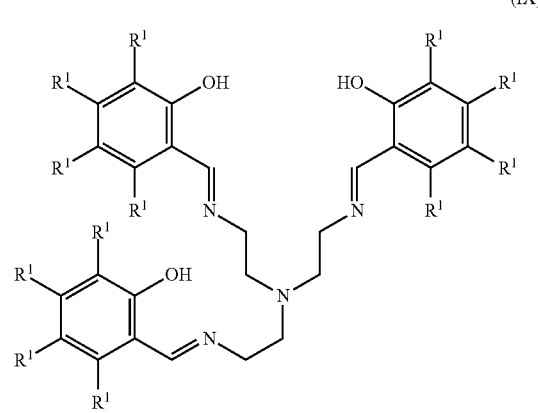

wherein:
each $R^1$ may be independently hydrogen or selected from the group consisting of cyano; halo; OR; COOR; nitro; linear or branched $C_{1-8}$alkyl; linear or branched partially fluorinated or perfluorinated $C_{1-8}$alkyl; NR'R"; linear or branched $C_{1-8}$ alkyl-R''', wherein —R''' is —$NH_2$, —OR, —COOR or —NR'R"; or —$CH_2N^+RR'R"$ or —$N^+RR'R"$, wherein each R is independently hydrogen or linear or branched $C_{1-4}$alkyl; and each R' and R" is independently hydrogen or linear or branched $C_{1-12}$alkyl, and

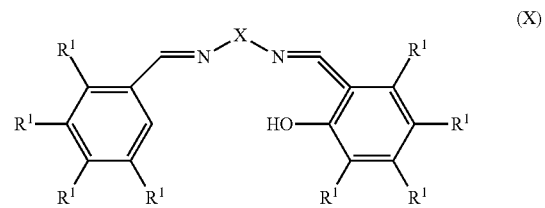

wherein:
each R' may be independently hydrogen or selected from the group consisting of cyano; halo; OR; COOR; nitro; linear or branched $C_{1-8}$alkyl; linear or branched partially fluorinated or perfluorinated $C_{1-8}$alkyl; NR'R"; linear or branched $C_{1-8}$ alkyl-R''', wherein —R''' is —$NH_2$, —OR, —COOR or —NR'R"; or —$CH_2N^+RR'R"$ or —$N^+RR'R"$, wherein each R is independently hydrogen or linear or branched $C_{1-4}$alkyl; each R' and R" is independently hydrogen or linear or branched $C_{1-12}$alkyl); and
X is $C_{2-8}$alkylene, optionally substituted by cyano, halo, OR, COOR or nitro).

Ligands of formula (IX) have been described in, for example, WO 02/02571 A1 and WO 01/05925 A1 (both Ciba Specialty Chemical Holding Inc.).

Typically, in ligands of formula (IX), each R1 is hydrogen, i.e. N,N',N"-tris(salicylideneaminoethyl)amine is preferred.

Typically, in ligands of formula (X), each R1 is hydrogen and X is selected from ethylene, n-propylene or cyclohexylene (for example 1,4-cyclohexylene or 1,2-cyclohexylene, in particular 1,2-cyclohexylene). Most typically, X is ethylene. According to a specific embodiment, the ligand of formula (XI) may be 1,1'-[1,2-ethanediylbis(nitrilomethylidyne)]bis-2-phenol. Manganese complexes of this ligand have been described by C A McAuliffe et al. (*J. Chem. Soc., Chem. Comm.*, 2193-2195 (1994)).

As described herein, the manganese complexes referred to in connection with the various aspects of this invention are formed from a chelant capable of chelating at least one manganese ion through four nitrogen atoms or a Schiff-base ligand, including the specific examples of such ligands described in detail herein. These ligands comprise donor atoms, which coordinate to one or more manganese ions of the manganese complexes described herein.

The concentration of the manganese complexes in the aqueous media described herein is typically between about 0.001 and about 50 µM, often between about 0.01 and 20 µM, and according to particular embodiments between about 0.1 and about 5 µM.

It is to be understood that, whilst the complexes may be introduced into the methods of the first and second aspect of the invention, and the aqueous medium in accordance with the third aspect of the invention may be prepared from such complexes, per se, which we refer to herein as well-defined complexes, well-defined complexes are not an essential feature of the invention.

By a well-defined complex is meant herein (as the term is used customarily in the art) a pre-formed complex (i.e. not one prepared in situ), which has been, or may be, isolated such that it is susceptible to characterisation (i.e. definition) and analysis (e.g. to determine its structure and degree of purity). In contrast, a complex that is not well-defined is one that is prepared in situ without isolation from the medium (e.g. reaction medium) in which it is prepared, and optionally used. That well-defined complexes are not a mandatory feature of the present invention is reflected in the kit of the fourth aspect of the invention, from which an appropriate manganese complex may be prepared, by mixing an appropriate amount of polydentate ligand with an appropriate amount and source of manganese ions, in a desired stoichiometry. Conversely, it is to be noted that the polydentate ligands in the kits of the invention may be in the form of the manganese complex, either well- or not well-defined.

It will be understood that there is no particular limitation as to the source of the manganese ions from which the manganese complexes described herein may be prepared, for example from kits or compositions of the invention. Typically, however, salts are selected from the group consisting of optionally hydrated $MnCl_2$, $MnBr_2$, $Mn(NO_3)_2$, $MnSO_4$, $Mn(acetylacetonate)_2$, $Mn(acetylacetonate)_3$, $Mn(R_5COO)_3$ (including $Mn(acetate)_3$) and $Mn(R_5COO)_2$, wherein $R_5$ is selected from a $C_1$-$C_{24}$ alkyl. Where the salt comprises two or more $R_5$ groups, these can be the same or different. The alkyl moieties, by which is meant saturated hydrocarbyl radicals, may be straight-chain or comprise branched and/or cyclic portions. Often the manganese salt is selected from the group consisting of optionally hydrated $MnCl_2$, $MnBr_2$, $Mn(NO_3)_2$, $MnSO_4$ and $Mn(OAc)_2$.

The term optionally hydrated is well known in the art. Metal salts often contain water molecules within a crystal lattice, which will remain present unless the hydrated metals salts are subjected to specific drying steps by heating or drying under reduced pressure. However, partially or fully dehydrated metal salts can also be used. For example, manganese (II) acetate and manganese (II) chloride can be bought as tetrahydrate salts or as dehydrated salts. Commercial manganese sulfate is available in both tetrahydrate and monohydrate forms.

According to particular embodiments of the invention, the complex used in accordance with the first and second aspect of the invention, or present in the aqueous medium of the third aspect, kit of the fourth aspect, or composition of the fifth aspect, of the invention, is pre-formed (used interchangeably herein with the term "well-defined"). Often it is desirable to use preformed manganese complexes.

The manganese complexes of use according to the various aspects of the invention are typically of the general formula (A1):

$$[Mn_aL_kX_n]Y_m \qquad (A1)$$

in which:

Mn represents a manganese selected from Mn(II), Mn(III), Mn(IV) and Mn(V); L represents a polydentate ligand, which is a chelant capable of chelating at least one manganese ion through four nitrogen atoms or a Schiff-base ligand as defined herein, or a protonated or deprotonated derivative thereof;

each X independently represents a coordinating species selected from any mono-, bi- or tri-charged anion or a neutral molecule able to coordinate a manganese ion in a mono-, bi- or tridentate manner, preferably selected from $O^{2-}$, $RBO_2^{2-}$, $RCOO^-$, $RCONR^-$, $OH^-$, $NO_3^-$, $NO$, $S^{2-}$, $RS^-$, $PO_4^{3-}$, $PO_3OR^{3-}$, $H_2O$, $CO_3^{2-}$, $HCO_3^-$, $ROH$, $N(R)_3$, $ROO^-$, $O_2^{2-}$, $O_2^-$, $RCN$, $Cl^-$, $Br^-$, $OCN^-$, $SCN^-$, $CN^-$, $N_3^-$, $F^-$, $I^-$, $RO^-$, $ClO_4^-$, and $CF_3SO_3^-$, and more preferably selected from $O_2$, $RBO_2^{2-}$, $RCOO^-$, $OH^-$, $NO_3^-$, $S^{2-}$, $RS^-$, $PO_4^{4-}$, $H_2O$, $CO_3^{2-}$, $HCO_3^-$, $ROH$, $N(R)_3$, $Cl^-$, $Br^-$, $OCN^-$, $SCN^-$, $RCN$, $N_3^-$, $F^-$, $I^-$, $RO^-$, $ClO_4^-$, and $CF_3SO_3^-$;

each R independently represents a group selected from hydrogen, hydroxyl, —R" and —OR", wherein R"=$C_1$-$C_{20}$alkyl, $C_2$-$C_{20}$alkenyl, $C_1$-$C_{20}$heterocycloalkyl, $C_6$-$C_{10}$aryl, $C_5$-$C_{10}$heteroaryl, (C=O) H, (C=O)—$C_1$-$C_{20}$alkyl, (C=O)—$C_6$-$C_{10}$aryl, (C=O)OH, (C=O)O—$C_1$-$C_{20}$alkyl, (C=O)O—$C_6$-$C_{10}$aryl, (C=O)$NH_2$, (C=O)NH ($C_1$-$C_{20}$alkyl), (C=O)NH($C_6$-$C_{10}$aryl), (C=O)N($C_1$-$C_{20}$alkyl)$_2$, (C=O)N($C_6$-$C_{10}$aryl)$_2$, R" being optionally substituted by one or more functional groups E, wherein E independently represents a functional group selected from —F, —Cl, —Br, —I, —OH, —OR', —$NH_2$, —NHR', —N(R')$_2$, —N(R')$_{3+}$, —C(O)R', —OC(O)R', —COOH, —COO— ($Na^+$, $K^+$), —COOR', —C(O)$NH_2$, —C(O)NHR', —C(O)N(R')$_2$, heteroaryl, —R', —SR', —SH, —P(R')$_2$, —P(O)(R')$_2$, —P(O)(OH)$_2$, —P(O)(OR')$_2$, —$NO_2$, —$SO_3H$, —$SO_3$—($Na^+$, $K^+$), —S(O)$_2$R', —NHC(O)R', and —N(R')C(O)R', wherein R' represents $C_6$-$C_{10}$aryl, $C_7$-$C_{20}$arylalkyl, or $C_1$-$C_{20}$alkyl each of which may be optionally substituted by —F, —Cl, —Br, —I, —$NH_{3+}$, —$SO_3H$, —$SO_3$($Na^+$, $K^+$), —COOH, —COO—($Na^-$, $K^+$), —P(O)(OH)$_2$, or —P(O)(O—($Na^+$, $K^+$))$_2$, and preferably each R independently represents hydrogen, $C_1$-$C_{40}$alkyl or optionally $C_1$-$C_{20}$alkyl-substituted $C_6$-$C_{10}$aryl, more preferably hydrogen or optionally substituted phenyl or naphthyl, or $C_{1-4}$alkyl;

Y is a non-coordinating counterion;

a is an integer from 1 to 10, typically from 1 to 4, more typically still 1 or 2;

k is an integer from 1 to 10 typically from 1 to 4, more typically still 1 or 2;

n is an integer from 1 to 10, typically from 1 to 4; and m is zero or an integer from 1 to 20, and is typically an integer from 1 to 8.

Generally, the manganese ion(s) of the complex are selected from the group consisting of Mn(II), Mn(III) and Mn(IV). Often, the complex comprises one or two such manganese ions. Where the complex comprises two or more manganese ions they may be of the same oxidation state or different oxidation states.

As used herein, within the definitions provided above for formula (A1) and elsewhere, unless a context expressly dictates to the contrary, the following definitions apply:

By alkyl is meant herein a saturated hydrocarbyl radical, which may be straight-chain, cyclic or branched. By alkylene is meant an alkyl group from which a hydrogen atom has been formally abstracted. Typically alkyl and alkylene groups will comprise from 1 to 25 carbon atoms, more usually 1 to 10 carbon atoms, more usually still 1 to 6 carbon atoms. The simplest alkylene group is methylene (—$CH_2$—).

By alkenyl is meant an unsaturated hydrocarbyl radical, which may be straight-chain, cyclic or branched, comprising one or more, typically one, non-aromatic carbon-carbon double bonds. By alkenylene is meant an alkenyl group from which a hydrogen atom has been formally abstracted. Typically alkenyl and alkenylene groups will comprise from 2 to 25 carbon atoms, more usually 2 to 10 carbon atoms, more usually still 2 to 6 carbon atoms. The simplest alkenylene group is ethenylene (—CH=CH—).

By alkynyl is meant an unsaturated hydrocarbyl radical, which may be straight-chain, cyclic or branched, comprising one or more, typically one, carbon-carbon triple bonds. By alkynylene is meant an alkynyl group from which a hydrogen atom has been formally abstracted. Typically alkynyl and alkynylene groups will comprise from 2 to 25 carbon atoms, more usually 2 to 10 carbon atoms, more usually still 2 to 6 carbon atoms.

The term aromatic used herein embraces within its scope heteroaromatic. As known to those skilled in the art, and used herein, heteroaromatic moieties may be regarded a subset of aromatic moieties that comprise one or more heteroatoms, typically oxygen, nitrogen or sulfur, often nitrogen, in place of one or more ring carbon atoms and any hydrogen atoms attached thereto. Examples of heteroaromatic moieties, for example, include pyridine, furan, pyrrole and pyrimidine.

Aromatic moieties may be polycyclic, i.e. comprising two or more fused aromatic (including heteroaromatic) rings. Naphthalene and anthracene are examples of polycyclic aromatic moieties, and benzimidazole is an example of a polycyclic heteroaromatic moiety.

Aryl radicals and arylene diradicals are formed formally by abstraction of one and two hydrogen atoms respectively from an aromatic moiety. Thus phenyl and phenylene are the aryl radical and arylene diradical corresponding to benzene. Similarly, pyridyl and pyridylene (synonymous with pyridindiyl) are the heteroaryl radical and heteroarylene diradical corresponding to pyridine. Unless a context dictates to the contrary, pyridyl and pyridylene are typically 2-pyridyl and pyridine-2,6-diyl respectively.

By heterocycloalkane is meant a cycloalkane, typically a $C_{5-6}$cycloalkane, in which one or more $CH_2$ moieties are replaced with heteroatoms, typically selected from the group consisting of nitrogen, oxygen and sulfur. Where the heteroatom is nitrogen, it will be understood that the $CH_2$ moiety is formally replaced with NH, not N. By heterocycloalkyl is meant herein a radical formed formally by abstraction of a hydrogen atom from a heterocycloalkane. Typical examples of heterocycloalkyl groups are those in which the heterocycloalkyl is formed formally by abstraction of a hydrogen atom from the nitrogen atom. Typical heterocycloalkyl groups include pyrrolidin-1-yl, piperidin-1-yl and morpholin-4-yl, i.e. in which the heterocycloalkyl is formed formally by abstraction of a hydrogen atom from the nitrogen atom of the parent heterocycloalkane.

By arylalkyl is meant aryl-substituted alkyl. Analogously, by aminoalkyl is meant amino-substituted alkyl, by hydroxyalkyl is meant hydroxy-substituted alkyl and so on.

Various alkylene bridges are described herein. Such alkylene bridges are typically although not necessarily straight chain alkylene bridges. They may, however, be cyclic alkylene groups (e.g. a $C_6$alkylene bridge may be cyclohexylene, and if so is typically cyclohexyl-1,4-ene). Where a bridge is, for example, a $C_6$-$C_{10}$arylene bridge, this may be, for example, phenylene or the corresponding arylene formed by abstraction of two hydrogen atoms from naphthalene. Where a bridge comprises one or two $C_1$-$C_3$alkylene units and one $C_6$-$C_{10}$arylene unit, such bridges may be, for example, —$CH_2C_6H_4CH_2$— or —$CH_2C_6H_4$—. Where present, phenylene is typically phenyl-1,4-ene. It will be understood that each of these bridges may be optionally substituted one or more times, for example once, with independently selected $C_1$-$C_{24}$ alkyl (e.g. $C_1$-$C_{18}$ alkyl) groups.

By carboxamide is meant a compound or radical comprising the functional group —N(H)C(O)—.

By carboxylic ester is meant a compound or radical comprising the functional group —OC(O)—.

By alkyl ether is meant a radical of the formula -alkylene-O-alkyl, wherein alkylene and alkyl are as herein defined.

The counter ions Y in formula (A1) balance the charge z on the complex formed by the ligand(s) L, manganese ion(s) and coordinating species X. If the charge z is positive, as it is in most cases, the manganese complex comprises one or more manganese ions and one or more non-coordinating counteranions Y. Examples of counteranions Y include $RCOO^-$, $BPh_4^-$, $ClO_4^-$, $BF_4^-$, $PF_6^-$, $RSO_3^-$, $RSO_4^-$, $SO_4^{2-}$, $S_2O_6^{2-}$, $NO_3^-$, $F^-$, $Cl^-$, $Br^-$, or $I^-$, with R being hydrogen, $C_1$-$C_{40}$alkyl or optionally $C_1$-$C_{20}$alkyl-substituted $C_6$-$C_{10}$aryl.

The identity of the counteranion(s) Y is, however, not an essential feature of the invention. Suitable counterions Y include those which give rise to the formation of storage-stable solids. Often counterions, including those for the preferred metal complexes, are selected from $Cl^-$, $Br^-$, $I^-$, $NO_3^-$, $ClO_4^-$, $PF_6^-$, $RSO_3^-$, $SO_4^{2-}$, $RSO_4^-$, $CF_3SO_3^-$, and $RCOO^-$, with R in this context being selected from H, $C_{1-12}$ alkyl, and optionally $C_{1-6}$alkyl-substituted $C_6H_5$ (i.e. wherein $C_6H_5$ is substituted one or more times (e.g. once) with a $C_{1-6}$alkyl group; often $C_6H_5$ is unsubstituted). Often, these will be selected from $Cl^-$, $NO_3^-$, $PF_6^-$, tosylate, $SO_4^{2-}$, $CF_3SO_3^-$, acetate, and benzoate. Particularly often, these will be selected from the group consisting of $Cl^-$, $NO_3^-$, $SO_4^{2-}$ and acetate.

Those complexes that comprise chelants capable of chelating at least one manganese ion through four nitrogen atoms are typically mononuclear manganese complexes comprising other monodentate ligands (X according to formula (A1)). Examples of suitable monodentate ligands include chloride, bromide or triflate ($CF_3SO_3^-$) anions. If manganese(II) species are used with chelants capable of chelating at least one manganese ion through four nitrogen atoms, two monoanionic, monodentate ligands will neutralise the charge of the manganese ion and no additional non-coordinating counterions will be present. However, if manganese(III) or manganese (IV) species are formed, then additional counterions X will be present, such as those defined in formula (A1), which are typically chloride, triflate or hexafluorophosphate.

In addition to anionic counterions, neutral monodentate ligands, such as acetonitrile or water, may be bound to the manganese ion(s). It will be understood that this possibility may also give rise to a charged manganese complex (i.e. with a bound Mn(II) ion, and thus occasions the presence of non-coordinating counterions. This discussion is premised on a manganese ion binding to 6 donor atoms. Although this is generally the case, it is not always so: Mn(II) ions are, for example, known to give rise to 7-coordinate complexes.

Complexes of formula (A1) typically comprise one or two manganese ions.

For dinuclear manganese complexes (i.e. manganese complexes comprising two manganese ions), there are often bridging ionic ligands presents, i.e. in addition to the bichelating octadentate ligands described herein. Examples of such additional bridging ligands include oxide ($O^{2-}$), hydroxide ($OH^-$) or $C_{1-6}$carboxylate (i.e. $RCO_2^-$ wherein R is a $C_{1-5}$alkyl group) ions, which bridge the two manganese ions. Where present, an alkylcarboxylate ion is typically acetate. Typically, dinuclear complexes comprise two bridging ions, for example, two acetate ions.

The substrate according to the second aspect of the invention need not be particularly limited and may be any substrate of which treatment with chlorine dioxide is desirable. According to some embodiments, the substrate is, or comprises, a polysaccharide, for example cellulose or starch, often cellulose. An example of a particularly important embodiment in this respect is the treatment of wood pulp. However, a wide variety of other substrates may be treated in accordance with the present invention. For example, the present invention is of broad utility in the treatment of food products, including but not limited to fruit & vegetables, meat and fish; in the treatment of hard surfaces, including but not limited to the sanitation of poultry & animal processing equipment and poultry and animal habitats; and in the treatment of biofilms.

In many of these applications, the aim is sterilisation: by treatment of a food product, for example, including but not limited to fruit, vegetables, meat and fish; a hard surface, such as those of equipment used in food processing (including poultry & animal processing), medical or laboratory equipment and equipment used in poultry and animal husbandry; and biofilms, for example on membranes, the aim is generally to effect sterilisation so as to eradicate or treat microorganisms, such as viruses, bacteria, and protozoa.

The IUPAC definition for biofilms (*Pure Appl. Chem.*, 84(2), 377-410 (2012)) is adopted herein, that is an aggregate of microorganisms in which cells that are frequently embedded within a self-produced matrix of extracellular polymeric substance adhere to each other and/or to a surface. Biofilms are frequently found on membranes present in all types of filtration apparatus. All such membranes are susceptible to fouling with biofilms, particularly those found in reverse osmosis systems. Accordingly, treatment of substrates susceptible to the formation of biofilm is a particularly useful embodiment of the present invention: prevention and/or treatment of biofilms reduces the need for servicing and cleaning, and thus can lead to lower maintenance and system operating costs. As well as equipment such as membranes, equipment susceptible to biofilm formation include, but are not limited to, pipes; cleaning (including laundry, dishwashing and bathing) equipment, such as sinks, baths, showers, dishwashers and washing machines, including the surfaces thereof (e.g. shower room walls and floors); cooling and heating systems; and marine apparatus (including hulls of ships and boats). Often biofilms form in environments frequently or permanently in contact with water. However, it will be understood that this is not necessarily the case, biofilm formation being a significant problem in the oil and gas industry, for example in pipelines and other production equipment.

It is therefore to be understood that the second aspect of the invention is of particular commercial utility in the treatment or prevention of biofilms, the method comprising treating any substrate on which a biofilm may be found, such as the equipment referred to in the previous paragraph.

In addition to the treatment or prevention of biofilms, microbiological control in water can also be achieved by employing present invention. It is therefore to be understood that the second aspect of the invention is also of particular commercial utility in the treatment of water. In this context, it will be understood that the method according to the second aspect of the invention provides a method of treating water, comprising contacting the water with an amount of a chlorine-containing chemical, which is chlorine dioxide and/or a chlorite salt; and a complex comprising one or more manganese ions and one or more polydentate ligands, which are either chelants capable of chelating at least one manganese ion through four nitrogen atoms or are Schiff-base ligands, with the proviso that the complex does not comprise a porphyrin or porphyrazine ligand.

The water that may be treated in accordance with the present invention is not limited. It may be, for example, water in municipal, commercial, industrial and domestic water systems, including drinking water, plant process water, cooling water or water found in swimming pools, boilers, conditioning equipment, or other industrial plant process water.

Although the subsequent discussion focuses on the treatment of cellulosic substrates, and in particular wood pulp (reflecting the commercial reality of the majority of chlorine dioxide usage), it is to be understood that the discussion in this respect is not limiting with the present invention being applicable mutatis mutandis to the treatment of other polysaccharide-containing substrates and indeed other classes substrates, including the treatment of water as described herein.

According to many embodiments of the invention, the substrate that is treated in accordance with the second aspect of the invention is or comprises a polysaccharide. Within the ambit of polysaccharide-containing substrates, cellulosic (i.e. cellulose-containing) substrates are particularly important commercially. Cellulosic substrates include primarily wood pulp and cotton (and thus cotton-containing material), as well as other plant-derived materials such as bagasse and jute. Treatment of cellulosic substrates is thus widespread, with the bleaching of both wood pulp and cotton being massive industries, cotton being subject to bleaching both in the treatment of raw cotton in the cotton-processing industry and also in laundry (domestic, industrial and institutional). In each case, the objective of the treatment is to bleach these substrates, by which is meant the oxidative removal of undesirable contaminants. In the treatment of raw cotton and wood pulp (and other plant-derived materials), these contaminants are generally polyphenolic materials, with lignin, which is responsible for the dark colour of unbleached wood pulp, comprising a significant proportion of wood. In laundry applications, the undesirable contaminants particularly targeted by bleaching include those responsible for stains.

In order to produce high quality paper grades, wood pulp needs to be delignified and bleached to a sufficient extent to produce white pulp which is also stable towards light- and time-induced yellowing/ageing. Typically, wood is ground, pulped and then treated at high temperatures with alkaline sulfide or sulfite to remove the majority of the lignin. The thus-treated pulp is generally referred to as chemical pulp.

An overview of the use of chlorine dioxide (and other bleaching agents) for wood pulp treatment can be found in Pulp Bleaching, Principles and Practice, C. W. Dence and D. W. Reeve, ed., Tappi, 1996.

Often in a first step, an oxygen delignification process is carried out, to remove about half of the lignin remaining in the chemical pulp. Then, this partly delignified pulp is often treated separately with chlorine dioxide and hydrogen peroxide. Dependent on the type of wood and the paper quality (brightness) desired, up to 2 to 3 separate steps employing chlorine dioxide and 1 to 2 stages with hydrogen peroxide are carried out. Alternatively, delignified and bleached pulp is frequently produced without the use of any chlorine-based bleaching chemicals, resulting in so-called total chlorine free (TCF) pulp.

In the first step after the oxygen delignification step, chlorine dioxide is used mainly as a delignification agent (D0-stage). In some cases, elemental chlorine is also used as a bleaching chemical, which can give good activity in conjunction with chlorine dioxide. Application of chlorine alone (i.e. without chlorine dioxide) is no longer practised, since this can result in the formation of undesirably large amounts of chlorinated waste products. In later stages of the pulp bleaching process (D1 or D2 stages), chlorine dioxide is mainly used to further bleach the pulp, which contains small residues of lignin.

Loadings of chlorine dioxide in pulp mills are typically between about 2 and about 10 wt % (with respect to oven-dry pulp), with processing carried out at about 40-100° C. The duration of the delignification varies but this typically from less than 1 h to 4 h.

It will be understood that the various aspects of the present invention are of utility in each step in wood pulp processing, for example those described above, in which chlorine dioxide may be used.

As noted above, the concentration of the chlorine-based bleaching chemical (chlorine dioxide or chlorite salt) in the aqueous media described herein is between about 0.1 and about 50 mM for example between about 5 and about 30 mM. The skilled person in the art will be able to optimise the amount required to attain the right level of bleaching or delignification of the wood pulp. The concentration of bleaching chemical, such as chlorine dioxide, is most often expressed in the context of pulp bleaching as kg/ton oven dry pulp (odp). Typical concentrations of chlorine dioxide currently used vary between about 5 and about 20 kg/ton odp. If the pulp is bleached at 10% consistency level, which means 100 g per kg odp in the bleaching liquor, the concentration of $ClO_2$ will be between 0.5 and 2 g/L (which on a molar basis equates to between 7.4 and 29.4 mM. However, it will be understood that the amount of chlorine dioxide or chlorite salt used in accordance with the present invention may be less than these whilst still retaining the desired extent of bleaching. Of course, the skilled person will be able to determine the appropriate quantity of chlorine dioxide or chlorite salt to use for any given method.

A further advantage of the present invention, particularly but not necessarily in the context of wood pulp processing arises from the reaction between hypochlorite and chlorite to form chloride and chlorine dioxide. Where aqueous media (e.g. solutions) contain chlorite, this will react with any hypochlorite, which may be formed after reaction of chlorine dioxide with partially oxidised lignin residues (cf *Pulp Bleaching, Principles and Practice*, C. W. Dence and D. W. Reeve, ed., 1996, at pages 133-138). Hypochlorite as a side product is less desirable as it may react with lignin residues to form chlorinated phenols. However, being a strong oxidant, hypochlorite reacts very efficiently with chlorite to form chloride and chlorine dioxide (cf Z Jia et al., *Inorg. Chem.*, 39(12), 2614-2620 (2000)), and so will react chlorite salt present, preventing hypochlorite reacting further to yield chlorinated side products.

Where used to obtain antimicrobial effect the amount of chlorine dioxide or is generally much lower than that used in the context of pulp bleaching, typically between 1 and 30 mg/l. It will be understood that the amount of chlorine dioxide (or chlorite salt) used in accordance with the present invention may be less than these whilst still retaining the desired extent of activity. Again, the skilled person will be able to determine the appropriate quantity of chlorine dioxide or chlorite salt to use for any given method.

In all methods according to the present invention, it will be appreciated that a particular benefit, where chlorite salts are used, is that chlorine dioxide does not need to be generated ex situ, as is the case presently.

Where the substrate treated in accordance with the methods of the first and second aspect of the invention is a polysaccharide substrate, and in particular a cellulosic substrate, the pH of the aqueous medium is generally between about 2 and about 11, more typically between about pH 3 and about pH 7. The pH of the aqueous medium can be easily set using the right level of alkali or acid (for example NaOH or HCl) or by using a buffered solution (as described elsewhere herein).

A much wider pH range may be used to obtain antimicrobial activities of chlorite or chlorine dioxide than for cellulosic treatment. In general a pH range between 3 and 11 can be employed for this application.

The temperature for practice of the methods of the invention may be determined by the skilled person. For example, cellulose treatment processes can be carried out at similar temperatures to those currently practised. Clearly, the optimum temperature will be substrate-dependent, and will often be between about 50 and about 70° C. for wood pulp bleaching, although improved bleaching processes have been achieved by increasing the temperature, known in the art as the $D_{HOT}$ process, for example to treat *eucalyptus* wood pulp. However, it should be noted that the methods described herein may achieve the same bleaching activity at lower temperatures than those achievable absent the manganese complexes described herein. Therefore, whilst the currently used temperature ranges for wood-pulp bleaching are typically between 50 and 100° C., use of the manganese complexes described herein may allow these temperatures to be lowered. For the treatment of polysaccharide-based substrates, temperatures of between about 30 and 100° C. are typical, for example between 40 and 95° C. For treatment of water or other substrates to attain antimicrobial effect, ambient temperatures (e.g. 15 to 30° C.) are generally appropriate. Nevertheless, it will be appreciated that the exact temperature can be determined without undue burden by those conducting any given method.

Each and every patent and non-patent reference referred to herein is hereby incorporated by reference in its entirety, as if the entire contents of each reference were set forth herein in their entirety.

The invention may be further understood with reference to the following non-limiting clauses:

1. A method of generating chlorine dioxide from a chlorine-containing chemical, which is a chlorite salt, comprising contacting, in an aqueous medium, a chlorite salt and a complex comprising one or more manganese ions and one or more polydentate ligands, which are either chelants capable of chelating at least one manganese ion through four nitrogen atoms or are Schiff-base ligands, with the proviso that the complex does not comprise a porphyrin or porphyrazine ligand.

2. A method of treating a substrate comprising contacting, in an aqueous medium, (i) the substrate (ii) an amount of a chlorine-containing chemical, which is chlorine dioxide and/or a chlorite salt; and (iii) a complex comprising one or more manganese ions and one or more polydentate ligands, which are either chelants capable of chelating at least one manganese ion through four nitrogen atoms or are Schiff-base ligands, with the proviso that the complex does not comprise a porphyrin or porphyrazine ligand.

3. The method of clause 1 or clause 2, wherein the substrate is a cellulosic substrate.

4. The method of clause 1 or clause 2, wherein the substrate is wood pulp.

5. The method of any one preceding clause, wherein the method comprises heating the aqueous medium to a temperature of between about 30 and about 100° C.

6. The method of clause 5, wherein the temperature is between about 40 and about 95° C.

7. The method of clause 2, wherein the substrate is a food product or equipment used in food processing, medicine, laboratories or poultry or animal husbandry.

8. The method of clause 2, which is for use in the treatment or prevention of a biofilm.

9. The method of clause 2, which is a method of treating water, comprising contacting the water with an amount of the chlorine-containing chemical and the complex.

10. The method of any one preceding clause, wherein the aqueous medium comprises at least 1 wt % of water.

11. The method of any one preceding clause, wherein the aqueous medium is a solution.

12. The method of any one preceding clause, wherein the aqueous medium comprises between about 0.001 and about 50 μM of the complex.

13. The method of clause 12, wherein the aqueous medium comprises between about 0.01 and about 20 μM of the complex.

14. The method of clause 12, wherein the aqueous medium comprises between about 0.1 and about 5 μM of the complex.

15. The method of clause 12, wherein the aqueous medium comprises between about 0.001 and about 5 μM of the complex.

16. The method of clause 12, wherein the aqueous medium comprises between about 0.01 and about 5 μM of the complex.

17. The method of any one preceding clause, wherein the chlorine-containing chemical is present in the aqueous medium in a concentration of between about 0.01 and about 50 mM.

18. The method of clause 17, wherein the chlorine-containing chemical is present in the aqueous medium in a concentration of between about 1 and about 30 mM.

19. The method of any preceding clause, wherein the pH of the aqueous medium is between about 2 and about 11.

20. The method of clause 19, wherein the pH of the aqueous medium is between about 3 and about 7.

21. The method of any one preceding clause, wherein the aqueous medium is buffered.

22. The method of any one preceding clause, wherein the method involves use of a chlorite salt selected from the group consisting of sodium chlorite, potassium chlorite, lithium chlorite, calcium chlorite, barium chlorite and magnesium chlorite.

23. The method of clause 22, wherein the chlorite salt is sodium chlorite or potassium chlorite.

24. The method of clause 22, wherein the chlorite salt is sodium chlorite.

25. The method of any one preceding clause, wherein the complex is pre-formed.

26. The method of any one preceding clause, wherein the complex comprises one or more manganese ions selected from the group consisting of Mn(II), Mn(III), Mn(IV) and Mn(V).

27. The method of clause 26, wherein the complex comprises one or more manganese ions selected from the group consisting of Mn(II), Mn(III) and Mn(IV).

28. The method of any one preceding clause, wherein the complex comprises one or two manganese ions.

29. The method of any one preceding clause, wherein the complex comprises a chelant capable of chelating at least one manganese ion through four nitrogen atoms, which is of formulae (I), (I-B), (II), (III), (IV), (V), (V-B), (V-C), (VI), (VI-B), (VII), (VII-B), (VIII) or (VIII-B):

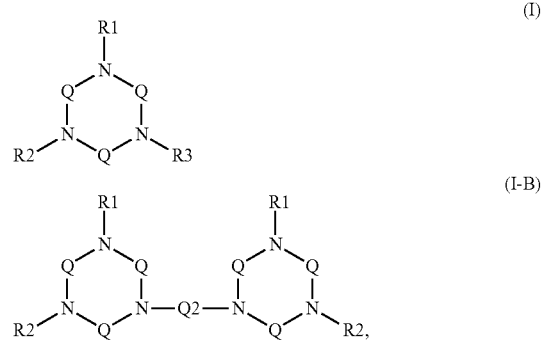

wherein:
each Q is independently selected from —CR4R5CR6R7— and —CR4R5CR6R7CR8R9-;
R4, R5, R6, R7, R8, and R9 are independently selected from: H, $C_1$-$C_4$alkyl and hydroxy$C_{1-4}$alkyl;
each R1 is independently selected from the group consisting of pyridin-2-ylmethyl, quinolin-2-ylmethyl, imidazol-2-ylmethyl, benzimidazol-2-ylmethyl, pyrazin-2-ylmethyl, pyrazol-1-ylmethyl, pyrazol-3-ylmethyl, 1,2,3-triazol-1-ylmethyl, 1,2,3-triazol-2-ylmethyl, 1,2,3-triazol-4-ylmethyl, 1,2,4-triazol-1-ylmethyl, 1,2,4-triazol-3-ylmethyl, thiazol-2-ylmethyl and $CH_2CH_2N(R10)(R11)$,
wherein N(R10)(R11) is selected from the group consisting of di($C_{1-44}$alkyl)amino; di($C_{6-10}$aryl)amino in which each of the aryl groups is independently optionally substituted with one or more $C_{1-20}$alkyl groups; di($C_{6-10}$aryl$C_{1-6}$alkyl)amino in which each of the aryl groups is independently optionally substituted with one or more $C_{1-20}$alkyl groups; NR7, in which R7 and the nitrogen atom N to which it is attached represent a heterocycloalkyl group optionally substituted with one or more $C_{1-20}$alkyl groups, which is connected to the remainder of R1 through the nitrogen atom N; di(heterocycloalkyl$C_{1-6}$alkyl)amino, in which each of the heterocycloalkyl groups is independently optionally substituted with one or more $C_{1-20}$alkyl groups; and di(heteroaryl$C_{1-6}$alkyl)amino, wherein each of the heteroaryl groups is independently optionally substituted with one or more $C_{1-20}$alkyl groups;

each R2 is independently selected from: hydrogen, $C_1$-$C_{24}$alkyl, $CH_2CH_2OH$, $CH_2COOH$ and $CH_2PO_3H_2$;

R3 is selected from the group consisting of H, $C_{1-24}$alkyl, $CH_2CH_2OH$, $CH_2COOH$ and $CH_2PO_3H_2$; and Q2 is a bridge selected from the group consisting of a $C_{1-6}$alkylene moiety, a $C_{6-10}$arylene moiety or a moiety comprising one or two $C_{1-3}$alkylene units and one $C_{6-10}$arylene unit, which bridge may be optionally substituted one or more times with independently selected $C_{1-24}$alkyl groups and OH groups;

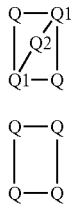
(II)

(III)

wherein:

each —Q— is independently selected from —N(R)C($R_1$)($R_2$)C($R_3$)($R_4$)— and —N(R)C($R_1$)($R_2$)C($R_3$)($R_4$)C($R_5$)($R_6$)—;

each —Q1— is independently selected from —N(R')C($R_1$)($R_2$)C($R_3$)($R_4$)— and —N(R')C($R_1$)($R_2$)C($R_3$)($R_4$)C($R_5$)($R_6$)—;

each R is independently selected from: hydrogen or is selected from the group consisting of $C_1$-$C_{20}$alkyl, $C_2$-$C_{20}$alkenyl, $C_2$-$C_{20}$alkynyl, $C_6$-$C_{10}$aryl and $C_7$-$C_{20}$arylalkyl, each of which may be optionally substituted with $C_1$-$C_6$alkyl;

the two —R' groups of the two Q1 groups together form bridging moiety —Q2—;

Q2 is a bridge selected from the group consisting of a $C_{2-6}$alkylene moiety, a $C_{6-10}$arylene moiety, or a moiety comprising one or two $C_1$-$C_3$alkylene units and one $C_6$-$C_{10}$arylene unit, which bridge may be optionally substituted one or more times with independently selected $C_{1-24}$alkyl groups; and $R_1$-$R_6$ are each independently selected from: H, $C_{1-4}$alkyl and hydroxy$C_{1-4}$alkyl;

$N(CY_2—R1)_3$ (IV)

wherein:

each —R1 is independently selected from —$CY_2N(C_1$-$C_{24}$alkyl$)_2$; —$CY_2NR7$, in which R7 and the nitrogen atom N to which it is attached represent a heterocycloalkyl group optionally substituted with one or more $C_{1-6}$alkyl groups, which is connected to the remainder of R1 through the nitrogen atom N; or represents an optionally $C_1$-$C_6$alkyl-substituted heteroaryl group selected from pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl; and each Y is independently selected from H, $CH_3$, $C_2H_5$, $C_3H_7$;

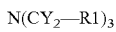
(V)

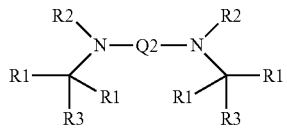
(V-B)

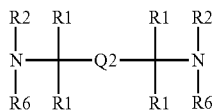
(V-C)

wherein:

each —R1 independently is selected from —$CH_2N(C_1$-$C_{24}$alkyl$)_2$, —$CH_2NR7$ or an optionally $C_1$-$C_6$alkyl-substituted heteroaryl group selected from pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl);

each —R2 independently represents —R4-R5;

each R3 and each R6 each independently represents hydrogen, or a group selected from $C_1$-$C_6$alkyl, $C_6$-$C_{10}$aryl, $C_5$-$C_{10}$heteroaryl, $C_6$-$C_{10}$aryl$C_1$-$C_6$alkyl and $C_5$-$C_{10}$heteroaryl$C_1$-$C_6$alkyl, each of which groups may be optionally $C_1$-$C_6$alkyl-substituted, with the proviso that no —R3 or —R6 may be one of the possibilities permitted for —R1;

each —R4— independently represents optionally $C_1$-$C_6$alkyl-substituted $C_1$-$C_6$alkylene;

each —R5 independently represents an —$CH_2N(C_1$-$C_{24}$alkyl$)_2$ group, —$CH_2NR7$ or an optionally $C_1$-$C_6$alkyl-substituted heteroaryl group selected from the group consisting of pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl;

each —NR7 independently represents a moiety in which R7 and the nitrogen atom N to which it is attached represent a heterocycloalkyl group optionally substituted with one or more $C_{1-20}$alkyl groups, which is connected to R4 through the nitrogen atom N; and Q2 represents a bridge selected from the group consisting of a $C_{1-6}$alkylene moiety $C_{6-10}$arylene moiety or a moiety comprising one or two $C_{1-3}$alkylene units and one $C_{6-10}$arylene unit, which bridge is optionally substituted one or more times with independently selected $C_{1-24}$alkyl groups and OH groups;

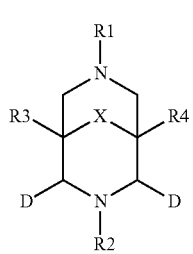
(VI)

-continued

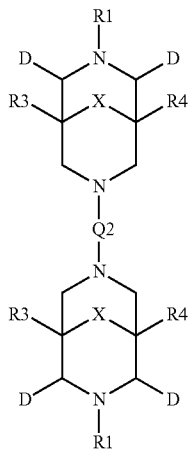
(VI-B)

wherein:

each D is independently selected from the group consisting of pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl, each of which may be optionally substituted by one or more groups independently selected from the group consisting of —F, —Cl, —Br, —OH, —OC$_1$-C$_4$alkyl, —NH—CO—H, —NH—CO—C$_1$-C$_4$alkyl, —NH$_2$, —NH—C$_1$-C$_4$alkyl, and —C$_1$-C$_4$alkyl;

the or each R1 and R2 are independently selected from the group consisting of C$_1$-C$_{24}$alkyl, C$_{6-10}$aryl and C$_{6-10}$arylC$_1$-C$_{24}$alkyl, each of which may be optionally substituted by one or more groups selected from —F, —Cl, —Br, —OH, —OC$_1$-C$_4$alkyl, —NH—CO—H, —NH—CO—C$_1$-C$_4$alkyl, —NH$_2$, —NH—C$_1$-C$_4$alkyl, and —SC$_1$-C$_4$alkyl;

R3 and R4 are independently selected from hydrogen, C$_1$-C$_8$alkyl, C$_1$-C$_8$alkyl-O—C$_1$-C$_8$alkyl, C$_6$-C$_{10}$aryloxyC$_1$-C$_8$alkyl, C$_6$-C$_{10}$aryl, hydroxyC$_1$-C$_8$alkyl and —(CH$_2$)$_{0-4}$C(O)OR5 wherein R5 is independently selected from: hydrogen, C$_1$-C$_8$alkyl and C$_{6-10}$aryl;

Q2 represents a bridge selected from the group consisting of a C$_{1-6}$alkylene moiety, a C$_{6-10}$arylene moiety or a moiety comprising one or two C$_{1-3}$alkylene units and one C$_{6-10}$arylene unit, which bridge is optionally substituted one or more times with independently selected C$_{1-24}$alkyl groups and OH groups; and X is selected from C=O, —[C(R6)$_2$]$_{0-3}$— wherein each R6 is independently selected from hydrogen, hydroxyl, C$_1$-C$_4$alkoxy and C$_1$-C$_4$alkyl;

R1R2N—X—NR1R2 (VII);

and

R1R2N—X-NR2-Q2-R2N—X—NR1R2 (VII-B);

wherein:

—X— is selected from —CY$_2$CY$_2$—, cis- or trans-1,2-cyclohexylene, —CY$_2$CY$_2$CY$_2$—, —CY$_2$C(OH)YCY$_2$—, with each Y being independently selected from H, CH$_3$, C$_2$H$_5$ and C$_3$H$_7$;

each R1 group is independently an alkyl, heterocycloalkyl, heteroaryl, aryl, arylalkyl or heteroarylalkyl group, each of which may be optionally substituted with a substituent selected from the group consisting of hydroxy, alkoxy, phenoxy, phosphonate, carboxylate, carboxamide, carboxylic ester, sulfonate, amine, mono- or dialkylamine and N$^+$(R3)$_3$, wherein R3 is selected from hydrogen, alkyl, alkenyl, arylalkyl, arylalkenyl, hydroxyalkyl, aminoalkyl, and alkyl ether, with the proviso that no R1 may be one of the possibilities permitted for R2;

each —R2 group is independently —CZ$_2$—R4, with each Z being independently selected from H, CH$_3$, C$_2$H$_5$, C$_3$H$_7$; and each —R4 being independently selected from optionally substituted —N(C$_1$-C$_{24}$alkyl)$_2$; —NR7, wherein each —NR7 independently represents a moiety in which R7 and the nitrogen atom N to which it is attached represent a heterocycloalkyl group optionally substituted with one or more C$_{1-6}$alkyl groups, which is connected to CZ$_2$ through the nitrogen atom N; and an optionally C$_1$-C$_6$alkyl-substituted heteroaryl group selected from the group consisting of pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl; and Q2 is a bridge selected from the group consisting of a C$_{1-6}$alkylene bridge, a C$_{6-10}$arylene bridge or a bridge comprising one or two C$_{1-3}$alkylene units and one C$_{6-10}$ arylene unit, which bridge may be optionally substituted one or more times with independently selected C$_{1-24}$alkyl groups and OH groups; and

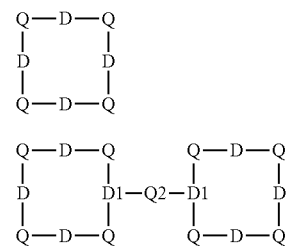

wherein:

each Q group independently represents —CY$_2$— or —CY$_2$CY$_2$—, in which each Y is independently selected from hydrogen, C$_{1-24}$alkyl, or a C$_{6-10}$aryl;

each D group independently represents a heteroarylene group or a group of the formula —NR—, with the proviso that at least one D group represents a heteroarylene group;

each D1 group represents a group of the formula —NR'—;

the two —R' groups of the two D1 groups together form bridging moiety —Q2—;

Q2 is a bridge selected from the group consisting of a C$_{1-6}$alkylene moiety, a C$_{6-10}$arylene moiety, or a moiety comprising one or two C$_1$-C$_3$alkylene units and one C$_6$-C$_{10}$arylene unit, which bridge may be optionally substituted one or more times with independently selected C$_{1-24}$alkyl groups and OH groups; and each R group independently represents H, C$_{1-24}$alkyl, C$_{6-10}$aryl or C$_{1-10}$heteroaryl.

30. The method of clause 29, wherein the complex comprises a polydentate ligand selected from the group consisting of those of formulae (I), (II), (III), (IV), (V), (VI), (VII) and (VIII).

31. The method of clause 29 or clause 30, wherein the complex comprises a polydentate ligand of formula (II), which is of formula (II-A):

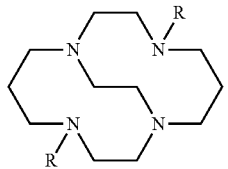

(II-A)

wherein R is as defined in clause 29 for formulae (II) and (II).

32. The method of clause 29 or clause 30, wherein the complex comprises a polydentate ligand of formula (VIII), which is of formula (VIII-A):

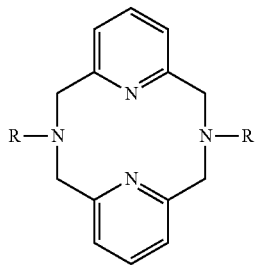

(VIII-A)

wherein R is as defined in clause 29 for formulae (VIII) and (VIII-B).

33. The method of clause 29, wherein the complex comprises a polydentate ligand selected from the group consisting of dimethyl 2,4-di-(2-pyridyl)-3,7-dimethyl-3,7-diaza-bicyclo[3.3.1]nonan-9-one-1,5-dicarboxylate, dimethyl 2,4-di-(2-pyridyl)-3,7-dibutyl-3,7-diaza-bicyclo[3.3.1]nonan-9-one-1,5-dicarboxylate, dimethyl 2,4-di-(2-pyridyl)-3,7-dioctyl-3,7-diaza-bicyclo[3.3.1]nonan-9-one-1,5-dicarboxylate, dimethyl 2,4-di-(2-pyridyl)-3,7-dibenzyl-3,7-diaza-bicyclo[3.3.1]nonan-9-one-1,5-dicarboxylate, 1-(pyridin-2-ylmethyl)-4,7-dimethyl-1,4,7-triazacyclononane, 1,2-bis(4-methyl-7-pyridin-2-yl-1,4,7-triazacyclonon-1-yl)-ethane and 1,3-bis(4-methyl-7-pyridin-2-yl-1,4,7-triazacyclonon-1-yl)-propane, 1,4,7,10-tetraazacyclododecane, 1,4,7,10-tetramethyl-1,4,7,10-tetraazacyclododecane, 1,4,8,11-tetraazacyclododecane, 1,4,8,11-tetramethyl-1,4,8,11-tetraazacyclododecane, 5,12-dimethyl-1,5,8,12-tetraaza-bicyclo[6.6.2]hexadecane, 5,12-dibenzyl-1,5,8,12-tetraaza-bicyclo[6.6.2]hexadecane, N-methyl-N-(pyridin-2-yl-methyl)-bis(pyridin-2-yl)methylamine, N-benzyl-N-(pyridin-2-yl-methyl)-bis(pyridin-2-yl)methylamine, N-methyl-N-(pyridin-2-yl-methyl-1,1-bis(pyridin-2-yl)-1-aminoethane, N-benzyl-N-(pyridin-2-yl-methyl-1,1-bis(pyridin-2-yl)-1-aminoethane), N-methyl-N-(pyridin-2-yl-methyl-1,1-bis(pyridin-2-yl)-2-phenyl-1-aminoethane, N-benzyl-N-(pyridin-2-yl-methyl-1,1-bis(pyridin-2-yl)-2-phenyl-1-aminoethane, 1,2-bis(N-(pyridin-2-yl-methyl)-bis(pyridin-2-yl)methylaminyl)-ethane,1,3-bis(N-(pyridin-2-yl-methyl)-bis(pyridin-2-yl)methylaminyl)-propane, 1,3-bis(N-(pyridin-2-yl-methyl)-bis(pyridin-2-yl)methylaminyl)-propan-2-ol, N,N'-dimethyl-N,N'-bis(pyridin-2-ylmethyl)ethylene-1-2-diamine, N,N'-dimethyl-N,N'-bis(pyridin-2-ylmethyl)-cyclohexane-1-2-diamine, N,N,N-tris(pyridin-2-ylmethyl)amine, 2,11-diaza[3.3](2,6-pyridinophane) and N,N'-dimethyl-2,11-diaza[3.3](2,6-pyridinophane).

34. The method of clause 29, wherein the complex comprises a polydentate ligand selected from the group consisting of 1,4-dimethyl-7-(pyridin-2-ylmethyl)-1,4,7-triazacyclononane, 4,11-dimethyl-1,4,8,11-tetraazabicyclo[6.6.2]hexane, tris(pyridin-2-ylmethyl)amine) and N-methyl-N-(pyridin-2-yl-methyl)-bis(pyridin-2-yl)methylamine.

35. The method of any one of clauses 1 to 28, wherein the complex comprises a Schiff-base ligand of formulae (IX) or (X):

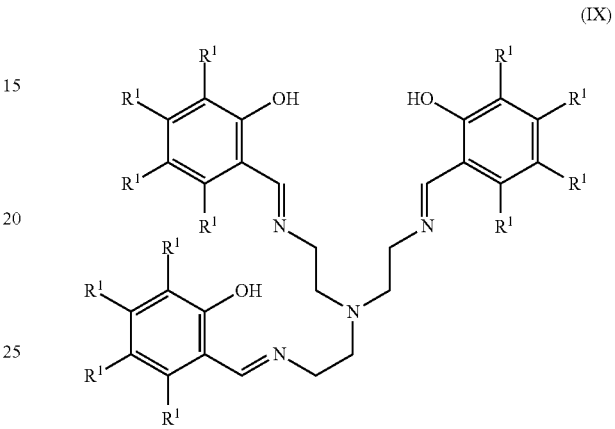

(IX)

wherein:
each $R^1$ may be independently hydrogen or selected from the group consisting of cyano; halo; OR; COOR; nitro; linear or branched $C_{1-8}$alkyl; linear or branched partially fluorinated or perfluorinated $C_{1-8}$alkyl; NR'R"; linear or branched $C_{1-8}$ alkyl-R''', wherein —R''' is —NH$_2$, —OR, —COOR or —NR'R"; or —CH$_2$N$^+$RR'R" or —N$^+$RR'R", wherein each R is independently hydrogen or linear or branched $C_{1-4}$alkyl; and each R' and R" is independently hydrogen or linear or branched $C_{1-12}$alkyl; and

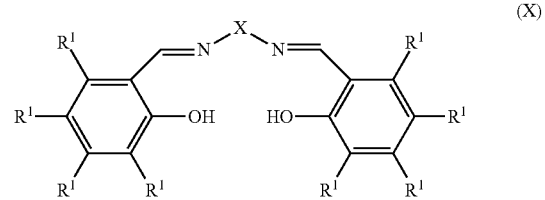

(X)

wherein:
each R' may be independently hydrogen or selected from the group consisting of cyano; halo; OR; COOR; nitro; linear or branched $C_{1-8}$alkyl; linear or branched partially fluorinated or perfluorinated $C_{1-8}$alkyl; NR'R"; linear or branched $C_{1-8}$ alkyl-R''', wherein —R''' is —NH$_2$, —OR, —COOR or —NR'R"; or —CH$_2$N$^+$RR'R" or —N$^+$RR'R", wherein each R is independently hydrogen or linear or branched $C_{1-4}$alkyl; each R' and R" is independently hydrogen or linear or branched $C_{1-12}$alkyl); and
X is $C_{2-8}$alkylene, optionally substituted by cyano, halo, OR, COOR or nitro).

36. The method of clause 35, wherein the ligand is N,N',N"-tris[salicylideneaminoethyl]amine or 1,1'-[1,2-ethanediylbis(nitrilornethylidyne)]bis-2-phenol.

37. An aqueous medium comprising a chlorine-containing chemical, which is chlorine dioxide and/or a chlorite salt, and a complex of one or more manganese ions and one or more polydentate ligands, which are either chelants capable of chelating at least one manganese ion through four nitrogen atoms or are Schiff-base ligands, with the proviso that the complex does not comprise a porphyrin or porphyrazine ligand.

38. The aqueous medium of clause 37, which comprises at least 1 wt % of water.

39. The aqueous medium of clause 37, which comprises between 50 and 100 wt % water, typically between 80 and 100 wt % water.

40. The aqueous medium of any one of clauses 37 to 39, which is as defined in any one of clauses 11 to 24.

41. The aqueous medium of any one of clauses 37 to 40, wherein the complex is as defined in any one of clauses 25 to 36.

42. A kit comprising a chlorite salt and, separately, one or more polydentate ligands, which are either chelants capable of chelating at least one manganese ion through four nitrogen atoms or one or more Schiff-base ligands, with the proviso that the one or more polydentate ligands are not porphyrin or porphyrazine ligands.

43. The kit of clause 42, wherein the chlorite salt is as defined in any one of clauses 22 to 24.

44. The kit of clause 42 or clause 43, wherein the polydentate ligand is as defined in any one of clauses 29 to 36.

45. The kit of any one of clauses 42 to 44, comprising a complex comprising one or more manganese ions and the one or more polydentate ligands.

46. A composition comprising a chlorite salt and one or more polydentate ligands, which are either chelants capable of chelating at least one manganese ion through four nitrogen atoms or one or more Schiff-base ligands, with the proviso that the one or more polydentate ligands are not porphyrin or porphyrazine ligands.

47. The composition of clause 46, wherein the polydentate ligand is as defined in any one of clauses 29 to 36.

48. The composition of clause 46 or clause 47, comprising a complex comprising one or more manganese ions and the one or more polydentate ligands.

49. The composition of any one of clauses 46 to 48, wherein the chlorite salt is as defined in any one of clauses 22 to 24.

The following non-limiting examples below serve to illustrate the invention further.

EXPERIMENTAL

Compound (1): $Mn(II)(NO_3)_2$ complex of dimethyl 2,4-di-(2-pyridin-2-yl)-3,7-dimethyl-3,7-diaza-bicyclo[3.3.1]nonan-9-one-1,5-dicarboxylate ($N_2py_2$)

The ligand, $N_2Py_2$, dissolved in ethanol (1 mM) was allowed to react for 30 minutes at room temperature with an equimolar amount of $Mn(II)(NO_3)_2$ (dissolved in water, 1 mM) to form the $Mn-N_2Py_2$ nitrate complex in situ. The ligand synthesis can be found in a publication by U. Holzgrabe and co-workers (Arch. Pharm., 322, 551-555 (1989)) and manganese complexes with this ligand were described by P. Comba et al., in *J. Chem. Soc., Dalton Trans*, 3997-4002 (1998).

Compound (2): $[Mn(II)(Me_2PyTACN)(CF_3SO_3)_2]$ ($Me_2PyTACN$=1,4-dimethyl-7-(pyridin-2-ylmethyl)-1,4,7-triazacyclononane) was prepared as described by M Costas, et al., *Org. Lett.*, 10, 2095-2098 (2008).

Compound (3): $[Mn(II)(TMC)Cl]PF_6$ (TMC=1,4,8,11-tetramethyl-1,4,8,11-tetraazacyclotetradecane).

Manganese complexes with L have been described by W. Nam and co-workers in Angew. Chem., 46, 377-380, (2007). The ligand can be purchased from Aldrich.

Compound (4): $[Mn(Bcyclam)C_2]$, (Bcyclam=4,11-dimethyl-1,4,8,11-tetraazabicyclo[6.6.2]hexadecane was prepared as described in WO98/39098 and *J. Am. Chem. Soc.*, 122, 2512-2522 (2000).

Compound (5): $[Mn(Me2-bispicen)C_2]$ (Me2-bispicen=N,N'-bis(pyridin-2-ylmethyl)-N,N'-dimethyl-1,2-ethylenediamine) was prepared as described elsewhere (WO 2000/012667).

Compound (6): $[Mn_2(\mu-O)_2(TPA)_2](S_2O_6)_{3/2}$ (TPA=tris(pyridin-2-ylmethyl)amine) was prepared as described by D. J. Hodgson et al. (*Inorg. Chim. Acta*, 141, 167-188 (1988)).

The synthesis of the TPA ligand has for example been described by G. Anderegg and F. Wenk, Helv. Chim. Acta, 50, 2330-2332 (1967).

Compound (7): $[Mn(py_2(NMe)_2)Cl_2]H_2O$ ($py_2(NMe)_2$=N,N-dimethyl-2,11-diaza[3.3](2,6)pyridinophane) was made as described by J J Girerd and co-workers (*Inorg. Chem.*, 44, 6959-6966 (2005)).

Compound (8): [MnL](MeOH) ($LH_3$=N,N',N"-Tris[salicylideneaminoethyl]amine was prepared as described by A Chakravorty and co-workers (*J. Chem. Soc., Dalton Trans.*, 863-869 (1993)).

Compound (9): $[(salen)Mn'''(CH_3CH_2COO)]$ (salen=N,N'-ethane-1,2-diylbis-(salicylideneiminate) was prepared according to C. A. McAuliffe and co-workers (*J. Chem. Soc., Chem. Comm.*, 2193-2195 (1994)).

Compound (10): N-methyl-N-(pyridin-2-yl-methyl)-bis(pyridin-2-yl)methylamine (MeN3Py) was prepared as disclosed elsewhere (EP11657381B).

The manganese complex was prepared in situ as described for compound (1).

Compound (Ref 1): [Mn(N4py)Cl]Cl (N4py=N,N-bis(pyridin-2-yl-methyl)-bis(pyridin-2-yl)methylamine)

The N4py ligand was prepared as described in EP0765381. The corresponding manganese(II) complex, [Mn(N4py)Cl]Cl, was prepared as described by Nam and co-workers in *J. Am. Chem. Soc.*, 136, 3680-3686 (2014).

Compound (Ref 2): Mn-Tetrakis-5,10,15,20-(N-methylpyridin-2-yl)porphyrin, and the corresponding Mn(III) complex as chloride salt, was prepared as described previously (N W J Kamp, J R Lindsay Smith, *J. Molec. Catal.*, 113, 131-145 (1996)).

This compound has been included in the experiments as a reference compound based on WO 2012/027216.

Experiment 1: Formation of Chlorine Dioxide from Sodium Chlorite

Experimental

As a reference, $ClO_2$ dissolved in water was prepared as follows. Sodium chlorite (5 g, 80% purity, dissolved in 15 ml water) was mixed with an HCl solution (37 wt %, 3 mL) in a flask with an nitrogen gas inlet and an outlet to a another flask containing water that was put in an ice-bath. A yellow solution slowly formed, which was then purged with nitrogen gas. The $ClO_2$ gas was then bubbled into the cold water from the other vessel, which led then to dissolution of $ClO_2$ in water. It should be noted that chlorine dioxide dissolves well in cold water and also shows a fairly good stability. The amount of chlorine dioxide has been determined by UV-vis (359 nm, extinction coefficient of 1250 $M^{-1}$ $cm^{-1}$). (*J. Am. Chem. Soc.*, 136, 3680-3686 (2014)).

The UV-vis spectrum of $ClO_2$ is shown in FIG. 1, which shows $ClO_2$ in water synthesized from chlorite. Sample diluted 20×.

The formation of $ClO_2$ from sodium chlorite was tested as follows. In an aqueous solution of pH 5 using acetic acid buffer (50 mM) and sodium chlorite (10 mM) and 10 and 1 µM of each complex was heated at 60° C. for 15 min (results listed in Table 1 below). Additional experiments were conducted with compounds 2 and 4 under the same conditions, but for 1 h and with concentrations of these compounds from 0.03 µM to 1 µM (results listed in Table 1a below). The formation of chlorine dioxide could be followed by monitoring the UV-vis spectrum (increase in absorbance at 359 nm), as also disclosed in literature (see for example FIG. 1 in *Angew. Chem., Int. Ed. Engl.*, 50, 695-698 (2011)). Additionally, one of the complexes (complex 6) was also tested for its activity to form $ClO_2$ at 40 and 25° C.

Results and Discussion

Figure 2:
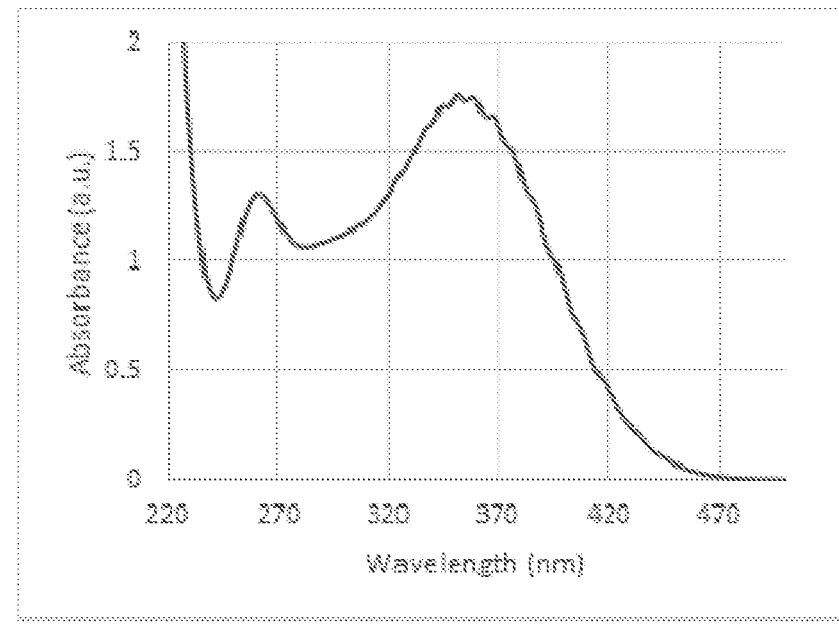
FIG. 2 depicts a representative example of a UV-vis spectrum of chlorine dioxide measured after adding [Mn (Bcyclam)Cl$_2$] (complex 4) to a buffered aqueous chlorite solution (Bcyclam=4,11-dimethyl-1,4,8,11-tetraazabicyclo [6.6.2]hexadecane). The peak at 261 nm is attributable to residual chlorite in the solution.

In all cases, formation of chlorine dioxide has been observed under the conditions outlined above (whilst the blank did not furnish any significant amount of chlorine dioxide). Table 1 shows the data. A representative example of a UV-vis spectrum of chlorine dioxide measured after adding compound 4 to a buffered aqueous chlorite solution is shown in FIG. 2, which shows the maximum concentration $ClO_2$ obtained by mixing 0.1 mM compound 4 with chlorite. The peak at 261 nm is due to residual chlorite in the solution.

Figure 3:
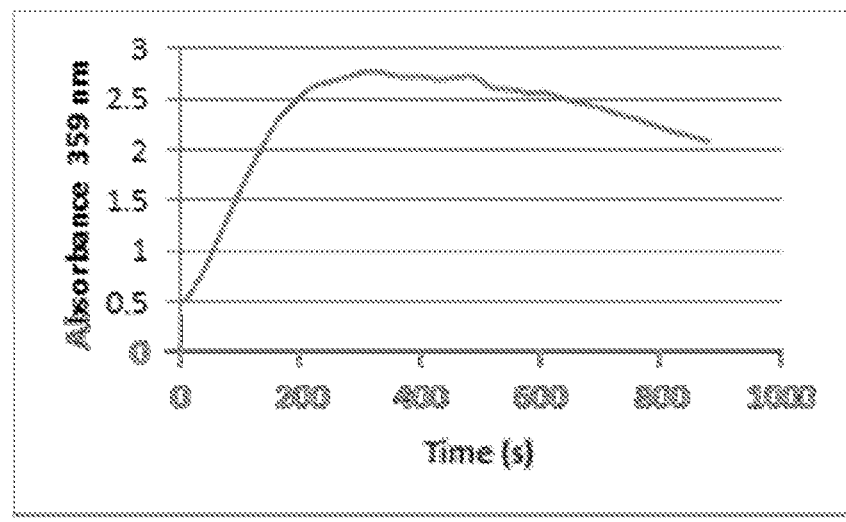
FIG. 3 depicts absorbance at 359 nm (indicative of the formation of chlorine dioxide) vs time upon mixing complex 4 (0.1 mM) with chlorite.

The results in Table 1 show that some compounds furnish $ClO_2$ more quickly than others (e.g. 2 and 4 are quite rapid in maximum formation of $ClO_2$). In many cases, a decrease in the absorbance at 359 nm could be observed, after having reached the maximum absorbance (see FIG. 3 as a representative example obtained by monitoring the absorbance at 359 nm after mixing compound 4 with chlorite, which shows absorbance at 359 nm (formation of $ClO_2$) vs time upon mixing 0.1 mM compound 4 with chlorite). The decrease in absorbance suggests that the $ClO_2$ formed may be decomposed as well. Furthermore, the amount of $ClO_2$ formed in some cases was higher than what could have been analysed for by UV-vis at this concentration. For this reason, as well as for comparison with dye bleaching result (vide infra), various complexes were also tested at lower concentrations, with in many cases good results (see Table 1). Especially complex 6 shows even at very low concentrations (1 µM), a high activity towards $ClO_2$ formation, but also the other complexes are more active at 1 µM than the blank. Compared to the manganese compound with the N4py (a pentadentate nitrogen donor chelant) as published in *J. Am. Chem. Soc.*, 136, 3680-3686 (2014) as being a very active complex for $ClO_2$ formation, at very low levels complex, the formation of chlorine dioxide is clearly less than those observed for the complexes within the scope of the present invention.

One of the complexes, 6, has been tested at lower temperatures as well and also then it facilitates $ClO_2$ formation, even at 25° C.

These results on $ClO_2$ formation show that the manganese complexes tested, which comprise polydentate ligands, which are either chelants capable of chelating at least one manganese ion through four nitrogen atoms or are Schiff-base ligands, are active and therefore could be used for different applications, such as cellulosic bleaching or antimicrobial treatment for example.

TABLE 1

Formation of chlorine dioxide (column 2 and 3) and Acid Blue 25 dye bleaching (columns 4 and 5) by different complexes and sodium chlorite. The amount of complex used for the chlorine dioxide formation was 10 µM and 1 µM. 1 µM and/or 10 µM of each complex was used for the Acid Blue dye bleaching.

| Cpd | $ClO_2$ formation Max. abs. in A.u. (time to reach max abs)[1,2,3] | | Acid Blue bleaching Δ Abs 602 nm (15')[4] | |
|---|---|---|---|---|
| | 10 µM | 1 µM | 1 µM | 10 µM |
| 1 | 0.5 (900 s) | 0.2 (900 s) | 0.6 | — |
| 2 | 2.8 (550 s) | 0.3 (900 s) | 0.2 | 1.2 |
| 3 | 0.13 (900 s) | 0.2 (900 s) | 0.9 | — |
| 4 | 2.8 (550 s) | 0.2 (900 s) | 0.9 | — |
| 5 | 2.6 (900 s) | 0.2 (900 s) | 1.0 | — |
| 6 (60° C.) | 2.9 (850 s) | 2.8 (900 s) | 1.0 | — |
| 6 (40° C.) | 1.2 (900 s) | 1.0 (900 s) | — | 1.2 |
| 6 (25° C.) | 0.5 (900 s) | 0.2 (900 s) | — | 1.01 |
| 7 | 1.9 (900 s) | 0.2 (900 s) | 0.1 | 1.1 |
| 8 | 1.5 (900 s) | 0.2 (900 s) | 0.3 | 1.1 |
| 9 | 2.3 (900 s) | 0.4 (900 s) | 0.7 | — |
| 10 | 2.6 (280 s) | 0.4 (900 s) | 1.0[5] | 1.0 |
| Ref 1 | 2.7 (900 s) | 0.05 (900 s) | 0.3 | — |
| No cat | <0.1 (900 s) | | | No reaction |

[1]Maximum absorbance at 359 nm measured as measure of chlorine dioxide formed at 60° C. (see experimental section above for details).
[2]Time to reach highest absorbance of $ClO_2$ in seconds. A smaller value indicates that the complex induces a faster formation of chlorine dioxide.
[3]The absorbance that can be measured accurately is less than 2.5 A.u. Therefore, no conclusions regarding the exact amounts of $ClO_2$ can be made from these data if the absorbance is >2.5 A.u.
[4]Difference in absorbance at 602 nm between a solution with a complex (concentration given in the table) and a solution without a complex (blank) indicating Acid Blue 25 dye bleaching activity. The blank gives a decrease in absorbance at 602 nm of about 0.02 A.U. A higher value of the bleaching observed with respect to the blank (combined with lower level of complex) indicates a better bleaching activity.
[5]Already fully bleached within 100 seconds

TABLE 1a

Formation of chlorine dioxide with different amounts of complexes 2 and 4 and sodium chlorite (Max. abs. in A.u. after 3600 s (1 h)).

| Compound* | 1 µM | 0.3 µM | 0.1 µM | 0.03 µM |
|---|---|---|---|---|
| 2 | 1.45 | 0.59 | 0.29 | 0.14 |
| 4 | 1.95 | 1.09 | 0.46 | 0.19 |

*Absorbance after 1 h with no compound added: 0.07

Experiment 2: Acid Blue 25 Dye Bleaching with Chlorite

Experimental

In a buffered aqueous solution (50 mM acetic acid buffer pH 5), Acid Blue 25 dye was added to reach an absorbance of approximately 1 at 602 nm. Sodium chlorite was added to yield 10 mM in the solution. Then various amounts of complex were added to test their activity towards dye bleaching (in most cases 1 µM, whilst some complexes were tested at 10 µM concentration). All experiments were done at 60° C. The decay of the absorbance at 602 nm was monitored (=bleaching of the dye) and the difference between starting absorbance and the absorbance measured at 15 minutes was noted (see Table 1).

Results and Discussion

As shown in Table 1, the complexes tested yielded improved dye bleaching activity as compared to the reference (without complex). A reference experiment using independently prepared $ClO_2$ (vide supra) yielded an immediate bleaching of the blue dye, suggested that the extent of dye bleaching is correlated to the $ClO_2$ formation measured as discussed above.

The results on $ClO_2$ formation and dye bleaching presented in Table 1, indicate that the complexes of the different classes of ligands as specified herein are active towards $ClO_2$ formation and therefore could be used for different applications, such as cellulosic bleaching, dye bleaching or antimicrobial treatment for example. Although not all complexes have been tested at lower temperatures, the one that was tested (compound 6) show also clear activity towards $ClO_2$ formation at 40 and 25° C., suggesting that these complexes may be employed at different temperatures ranging from ambient to at least 60° C.

Experiment 3: Bleaching Experiments of Hardwood Pulp with Chlorite

Experimental

Hardwood chemical pulp that has been delignified in an $O_2$ delignification step, with a starting ISO-brightness of 50.6 was treated as follows: 1 g of oven-dry pulp was added to a series of small beaker-glasses containing 19 mL of water with 50 mM acetate buffer at pH 5 and 20 mg of $NaClO_2$. When appropriate, an aqueous solution of the manganese complex was added to yield the desired level of complex (see Table 2 for concentration of each complex used). All experiments were carried out at 5% consistency (the exact amounts of pulp added therefore depended on the consistency of the starting pulp). The temperature was set at 60° C. and the reaction mixture was kept at this temperature for 1 h. Manual stirring was done twice or three times during the bleaching experiments. Subsequently the pulp mixture is filtrated through a Buchner funnel, washed with copious amounts of demineralised water and dried overnight at ambient conditions. The optical properties of the pulp heaps were then measured using a Minolta spectrophotometer CM-3700d, using L, a, b values which are converted to whiteness values through the following formula:

$$100-\sqrt{(100-L)^2+a^2+b^2}$$

The ISO-Brightness values are calculated through the following formula:

$$ISO\text{-Brightness}=(1.98*\text{whiteness})-100.3.$$

Results and Discussion

The results of the experiment are given in Table 2.

TABLE 2

ISO-Brightness results of bleaching hardwood pulp using $NaClO_2$ and the manganese complexes at pH 5 at 60° C. for 60 minutes. Numbers in parentheses indicate the amount of complex added in ppm (or mg per kg of oven dry pulp).

| Compound | Δ Brightness pulp (wrt blank-no cat) |
|---|---|
| 2 | 10(94 ppm) |
| 4 | 9(12 ppm) |
| Ref 2 | 1(30 ppm) |
| Mn(II)acetate | 0(100 ppm) |

As shown in Table 2, a number of the complexes tested give good bleaching effects with sodium chlorite at low levels (10-30 ppm). Complex 4 in particular shows a good bleaching with chlorite at relatively low levels.

Mn-DTPA shows no pulp bleaching activity at 100 ppm level. It should be noted that DTPA is widely used as a sequestrant agent prior to peroxide bleaching stages (so-called Q-stage) to remove metal ions that may interfere with hydrogen peroxide/stability. Also, Mn acetate at relatively high levels does not show any bleaching activity.

It is also noted that, compared to reference compound Ref 2 (a water soluble Mn-porphyrin such as those claimed in WO 2012/027216), the manganese complexes presented in Table 2 show a much better pulp bleaching activity.

Experiment 4: Acid Blue 25 and Acid Red 88 Dye Bleaching with Chlorine Dioxide Experimental In a buffered aqueous solution (50 mM acetic acid buffer pH 5), Acid Blue 25 dye was added to reach an absorbance of approximately 1.23 at 602 nm. 0.1 mM of chlorine dioxide was added and various amounts of the complex (compound 4) were added to test their activity towards dye bleaching. (note: chlorine dioxide was prepared from sodium chlorite and HCl as shown in Experiment 1).

All experiments were done at 30° C. The decay of the absorbance at 602 nm was monitored (=bleaching of the dye) and the difference between starting absorbance and the absorbance measured at 15 minutes was noted (see Table 3). A higher value indicates a better bleaching activity. A similar set of experiments was done using Acid Red 88 as dye (following the changes in absorbance at 502 nm, starting at an absorbance of 1.95).

Results and Discussion

As is shown in Table 3, the addition of compound 4 to 0.1 mM $ClO_2$ resulted in much lower absorbances of Acid Blue 25 and Acid Red 88 due after 15 minutes reaction time. There is therefore an improved dye bleaching activity as compared to the reference (without compound 4). As these absorbances were monitored after 15 minutes, they do not reflect the time dependencies of the bleaching. Therefore, FIGS. 4 and 5 have been included to show a typical time-dependent bleaching by $ClO_2$ without and with the complex. They show, respectively, absorbance at 602 nm of Acid Blue 25 dye, and absorbance at 502 nm of Acid Red 88 dye, vs time, of 0.1 mM $ClO_2$ without complex and with 10 μM complex 4.

Figure 4:
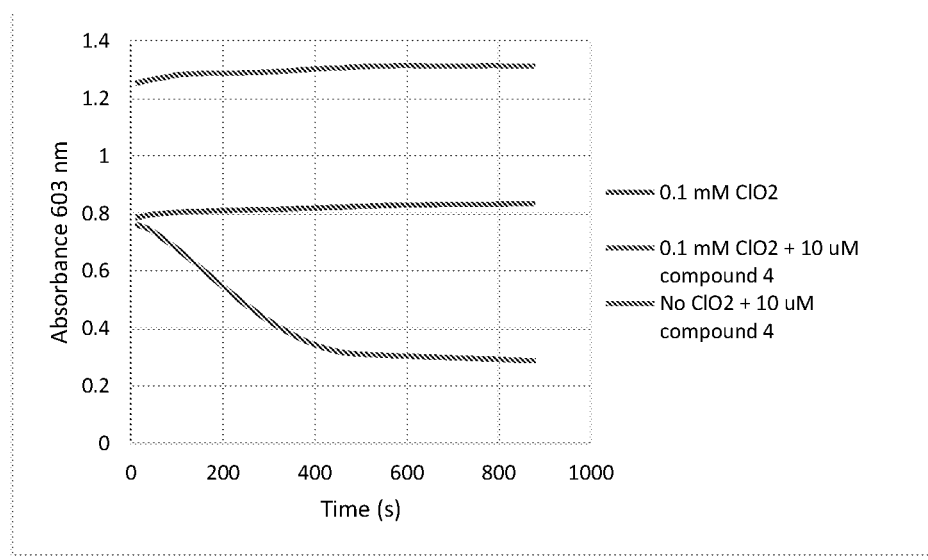
FIG. 4 depicts a plot of absorbance at 602 nm of Acid Blue 25 dye against time of 0.1 mM ClO$_2$ without complex (shown in middle of graph) and with 10 μM complex 4 (shown at bottom of graph). Shown at the top of the graph is a plot of absorbance against time in the presence of 10 μM complex 4 but prior to addition of ClO$_2$.
Figure 5:
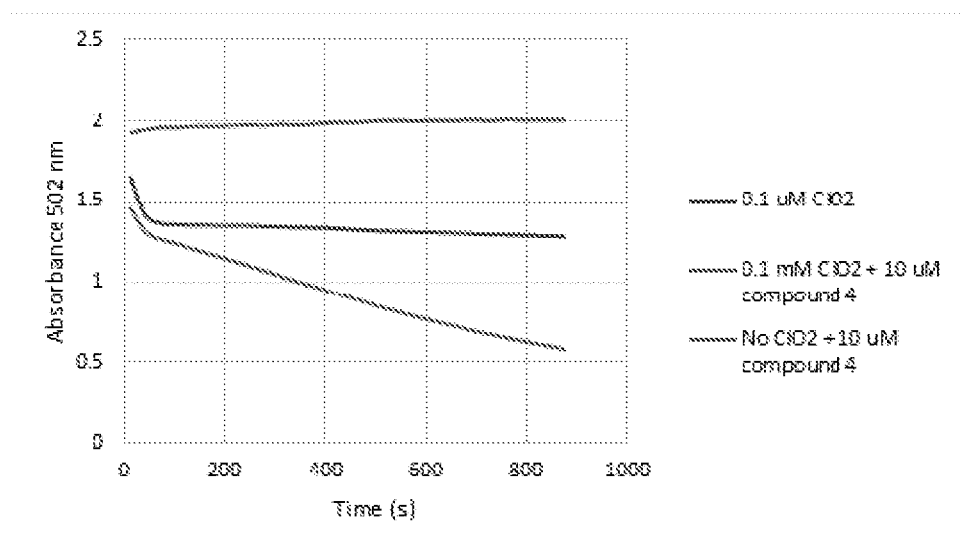
FIG. 5 depicts a plot of absorbance at 502 nm of Acid Red 88 dye against time of 0.1 mM ClO$_2$ without complex (shown in middle of graph) and with 10 μM complex 4 (shown at bottom of graph). Shown at the top of the graph is a plot of absorbance against time in the presence of 10 μM complex 4 prior to addition of ClO$_2$.

Addition of $ClO_2$ to the solution with the dye (without complex), led to a very rapid decrease of the dye intensity. This is shown in FIG. 4, where the addition of 0.1 mM $ClO_2$ led to a decrease in absorbance of approximately 1.2 to about 0.8. Addition of the complex to the dye and chlorine dioxide leads to the same rapid decrease to 0.8 a.u., but then the bleaching of the dye continues at a slower rate (see FIG. 4—lowest line). A similar effect was observed for Acid Red 88 dye (FIG. 5).

These observations are in agreement with the suggestion that, after bleaching of the dye by $ClO_2$, the chlorite presumably formed can be regenerated by the complex (as noted from the formation of $ClO_2$ out of chlorite when using complex 4, see Experiment 1).

TABLE 3

Acid Blue 25 (AB25) and Acid Red 88 (AR88) dye bleaching by complex 4 (different concentrations) and chlorine dioxide.

|  | 0.1 mm $ClO_2$ Δ Abs AB25 602 nm (15')[1] | 0.1 mM $ClO_2$ Δ Abs AR88 503nm (15')[2] |
| --- | --- | --- |
| Blank | 0.40 | 0.67 |
| 1 μM | 0.53 | 0.91 |
| 3 μM | 0.82 | 1.03 |
| 10 μM | 0.94 | 1.37 |
| 30 μM | 0.98 | 1.68 |

[1]Change in absorbance at 602 nm of Acid Blue 25 dye between the initial value and the solution after 15 minutes reaction time. Comparisons are made between the differences in absorbance with the complex (compound 4 in different concentrations) and those without. A larger difference suggests that the effect of the complex increases the bleaching effect by $ClO_2$.
[2]Difference in absorbance at 503 nm using Acid Red 88 after 15 min reaction time.

Experiment 5: Stain Bleaching on Cotton

In an aqueous solution of pH 5 using acetic acid buffer (50 mM), sodium chlorite (0.1 g/L), 10, 3 or 1 μM of each complex, and 1 g of BC-1 tea stains (a well-known model for tea stains) was added and heated to 60° C. for 30 min while stirring continuously. The total volume was 100 mL. After this, the BC-1 was washed two times in demineralized water and dried before measuring the reflectance at 460 nm using a Minolta spectrophotometer CM-3700d. Details of the procedures to measure the reflectance at 460 nm of BC1 stains can be found elsewhere (EP 0 909 809 B (Unilever plc and Unilever N.V.)).

One of the complexes, 6 was also tested for its performance at 40° C. and 25° C. following the same procedure as shown above (see Footnote 1 to Table 4 below).
Results and Discussion The results of the BC-1 bleaching experiments of sodium chlorite with different complexes are presented in Table 4. In all cases a clear enhancement in the bleaching activity was observed, often, when tested, even with lower levels of complexes. Especially compounds 2, 4, and 6 show a high bleaching activity. It should be noted that whilst Mn-N4py (as per reference: *J. Am. Chem. Soc.*, 136, 3680-3686 (2014)) shows a good bleaching activity at 10 μM (denoted as Ref 1 in Table 4), the bleaching effect is very much reduced at 3 μM and far below to what has been observed when employing for example compounds 2, 4, and 6 at this level. Further it was observed that using the TPA ligand of compound 6 (without the manganese ion) furnishes bleaching as well. Without being bound to theory, it is assumed that the BC-1 stain, derived from tea, which contains manganese ions, binds to the TPA ligand and then forms active catalytic species in situ.

TABLE 4

BC-1 bleaching (in ΔR) of sodium chlorite (100 mg/l) in the absence and presence of different complexes at 60° C. for 30 min.[1]

| Compound | 10 μM ΔR | 3 μM ΔR | 1 μM ΔR |
| --- | --- | --- | --- |
| 2 | 38.6 | 36.6 | 18.1 |
| 3 | 10.4 | 6.3 |  |
| 4 | 38.8 | 30.0 | 25.4 |
| 5 | 19.6 | 6.9 | 6.5 |
| 6 | 37.7 | 38.7 | 32.9 |
| TPA Ligand (no Mn) | 17.3 | 12.9 | — |
| 7 | 21.2 | 11.4 |  |
| 8 | 14.1 | 9.8 | 7.9 |
| 9 | 18.9 | 10.3 | 6.8 |
| 10 | 38.9 | 29.3 | 6.5 |
| Ref 1 | 35.2 | 10.0 |  |
| No complex |  | 7.1 |  |

[1]Compound 6 has also been tested under the same conditions at 40° C., yielding ΔR = 25.2 (10 μM) and 20.3 (3 μM). At 25° C. the ΔR values were 15.2 (10 μM) and 6.3 (3 μM).

The invention claimed is:

1. An aqueous medium comprising a chlorine-containing chemical, wherein the chlorine-containing chemical is a chlorite salt, and a complex of one or more manganese ions and one or more polydentate ligands, which are either chelants capable of chelating at least one manganese ion through four nitrogen atoms or are Schiff-base ligands that are imine-containing polydentate ligands, with the proviso that the complex does not comprise a porphyrin or porphyrazine ligand and wherein the aqueous medium comprises between about 0.001 and about 5 μM of the complex.

2. A method of generating chlorine dioxide from a chlorine-containing chemical; which is a chlorite salt, comprising contacting; in an aqueous medium, a chlorite salt and a complex comprising one or more manganese ions and one or more polydentate ligands, which are either chelants capable of chelating at least one manganese ion through four nitrogen atoms or are Schiff-base ligands that are imine-containing polydentate ligands, with the proviso that the complex does not comprise a porphyrin or porphyrazine ligand and wherein the aqueous medium comprises between about 0.001 and about 5 μM of the complex.

3. A method of treating a substrate comprising contacting, in an aqueous medium, (i) the substrate (ii) an amount of a chlorine-containing chemical, which is a chlorite salt; and (iii) a complex comprising one or more manganese ions and one or more polydentate ligands, which are either chelants capable of chelating at least one manganese ion through four nitrogen atoms or are Schiff-base ligands that are imine-containing polydentate ligands, with the proviso that the complex does not comprise a porphyrin or porphyrazine ligand and wherein the aqueous medium comprises between about 0.001 and about 5 μM of the complex.

4. The method of claim 3, wherein the substrate is a cellulosic substrate.

5. The method of claim 3, which is a method of treating water, comprising contacting the water with an amount of the chlorine-containing chemical and the complex.

6. The method of claim 2, wherein the aqueous medium comprises between about 0.1 and about 5 μM of the complex.

7. The method of claim 2, wherein the method involves use of a chlorite salt selected from the group consisting of sodium chlorite, potassium chlorite, lithium chlorite, calcium chlorite, barium chlorite and magnesium chlorite.

8. The method of claim 2, wherein the complex is pre-formed.

9. The aqueous medium of claim 1, wherein the complex comprises a chelant capable of chelating at least one manganese ion through four nitrogen atoms, which is of formulae (I), (I-B), (II), (III), (IV), (V), (V-B), (V-C), (VI), (VI-B), (VII), (VII-B), (VIII) or (VIII-B):

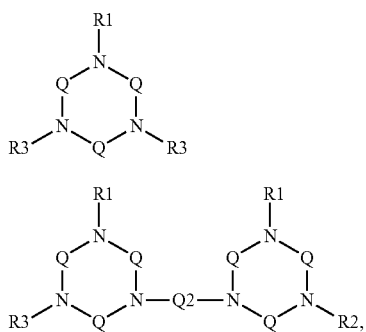

wherein:
each Q is independently selected from —CR4R5CR6R7— and —CR4R5CR6R7CR8R9—;
R4, R5, R6, R7, R8, and R9 are independently selected from: H, $C_1$-$C_4$alkyl and hydroxy$C_{1-4}$alkyl;
each R1 is independently selected from the group consisting of pyridin-2-ylmethyl, quinolin-2-ylmethyl, imidazol-2-ylmethyl, benzimidazol-2-ylmethyl, pyrazin-2-ylmethyl, pyrazol-1-ylmethyl, pyrazol-3-ylmethyl, 1,2,3-triazol-1-ylmethyl, 1,2,3-triazol-2-ylmethyl, 1,2,3-triazol-4-ylmethyl, 1,2,4-triazol-1-ylmethyl, 1,2,4-triazol-3-ylmethyl, thiazol-2-ylmethyl and CH$_2$CH$_2$N(R10)(R11),
wherein N(R10)(R11) is selected from the group consisting of: di($C_{1-44}$alkyl)amino; di($C_{6-10}$aryl)amino in which each of the aryl groups is independently optionally substituted with one or more $C_{1-20}$alkyl groups; di($C_{6-10}$aryl$C_{1-6}$alkyl)amino in which each of the aryl groups is independently optionally substituted with one or more $C_{1-20}$alkyl groups; NR7, in which R7 and the nitrogen atom N to which it is attached represent a heterocycloalkyl group optionally substituted with one or more $C_{1-20}$alkyl groups, which is connected to the remainder of R1 through the nitrogen atom N; di(heterocycloalkyl$C_{1-6}$alkyl)amino, in which each of the heterocycloalkyl groups is independently optionally substituted with one or more $C_{1-20}$alkyl groups; and di(heteroaryl$C_{1-6}$alkyl)amino, wherein each of the heteroaryl groups is independently optionally substituted with one or more $C_{1-20}$alkyl groups;
each R2 is independently selected from: hydrogen, $C_1$-$C_{24}$alkyl, CH$_2$CH$_2$OH, CH$_2$COOH and CH$_2$PO$_3$H$_2$;
R3 is selected from the group consisting of H, $C_{1-24}$alkyl, CH$_2$CH$_2$OH, CH$_2$COOH and CH$_2$PO$_3$H$_2$; and
Q2 is a bridge selected from the group consisting of a $C_{1-6}$alkylene moiety, a $C_{6-10}$arylene moiety or a moiety comprising one or two $C_{1-3}$alkylene units and one $C_{6-10}$arylene unit, which bridge may be optionally substituted one or more times with independently selected $C_{1-24}$alkyl groups and OH groups;

wherein:
each —Q— is independently selected from —N(R)C(R$_1$)(R$_2$)C(R$_3$)(R$_4$)— and —N(R)C(R$_1$)(R$_2$)C(R$_3$)(R$_4$)C(R$_5$)(R$_6$)—;
each —Q1— is independently selected from —N(R')C(R$_1$)(R$_2$)C(R$_3$)(R$_4$)— and —N(R')C(R$_1$)(R$_2$)C(R$_3$)(R$_4$)C(R$_5$)(R$_6$)—;
each R is independently selected from: hydrogen or is selected from the group consisting of $C_1$-$C_{20}$alkyl, $C_2$-$C_{20}$alkenyl, $C_2$-$C_{20}$alkynyl, $C_6$-$C_{10}$aryl and $C_7$-$C_{20}$arylalkyl, each of which may be optionally substituted with $C_1$-$C_6$alkyl;
the two R' groups of the two Q1 groups together form bridging moiety —Q2—;
Q2 is a bridge selected from the group consisting of a $C_{2-6}$alkylene moiety, a $C_{6-10}$arylene moiety, or a moiety comprising one or two $C_1$-$C_3$alkylene units and one $C_6$-$C_{10}$arylene unit, which bridge may be optionally substituted one or more times with independently selected $C_{1-24}$alkyl groups; and
R$_1$-R$_6$ are each independently selected from: H, $C_{1-4}$alkyl and hydroxy$C_{1-4}$alkyl;

$$N(CY_2\text{—}R1)_3 \qquad (IV)$$

wherein:
each —R1 is independently selected from —CY$_2$N($C_1$-$C_{24}$alkyl)$_2$; —CY$_2$NR7, in which R7 and the nitrogen atom N to which it is attached represent a heterocycloalkyl group optionally substituted with one or more $C_{1-6}$alkyl groups, which is connected to the remainder of R1 through the nitrogen atom N; or represents an optionally $C_1$-$C_6$alkyl-substituted heteroaryl group selected from pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl; and
each Y is independently selected from H, CH$_3$, C$_2$H$_5$, C$_3$H$_7$;

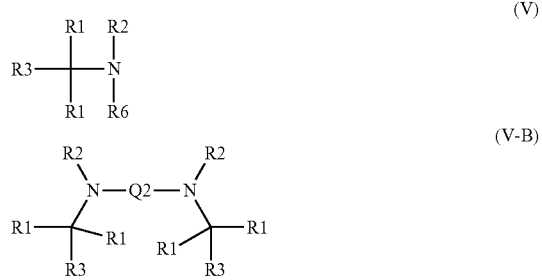

-continued

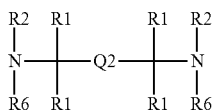
(V-C)

wherein:

each —R1 independently is selected from —CH$_2$N(C$_1$-C$_{24}$alkyl)$_2$, —CH$_2$NR7 or an optionally C$_1$-C$_6$alkyl-substituted heteroaryl group selected from pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-4-yl, 1,2,4-triazol-1-yl 1,2,4-triazol-3-yl and thiazol-2-yl);

each —R2 independently represents —R4—R5;

each R3 and each R6 each independently represents hydrogen, or a group selected from C$_1$-C$_6$alkyl, C$_6$-C$_{10}$aryl, C$_5$-C$_{10}$heteroaryl, C$_6$-C$_{10}$arylC$_1$-C$_6$alkyl and C$_5$-C$_{10}$heteroarylC$_1$-C$_6$alkyl, each of which group may be optionally C$_1$-C$_6$alkyl-substituted, with the proviso that no —R3 or —R6 may be one of the possibilities permitted for —R1;

each —R4— independently represents optionally C$_1$-C$_6$alkyl-substituted C$_1$-C$_6$alkylene;

each —R5 independently represents an —CH$_2$N(C$_1$-C$_{24}$alkyl)$_2$ group, —CH$_2$NR7 or an optionally C$_1$-C$_6$alkyl-substituted heteroaryl group selected from the group consisting of pyridin-2-yl, pyrazin-2-yl, quinolin-2-yl, pyrazol-1-yl, pyrazol-3-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-3-yl and thiazol-2-yl;

each —NR7 independently represents a moiety in which R7 and the nitrogen atom N to which it is attached represent a heterocycloalkyl group optionally substituted with one or more C$_{1-20}$alkyl groups, which is connected to R4 through the nitrogen atom N; and Q2 represents a bridge selected from the group consisting of a C$_{1-6}$alkylene moiety C$_{6-10}$arylene moiety or a moiety comprising one or two C$_{1-3}$alkylene units and one C$_{6-10}$arylene unit, which bridge is optionally substituted one or more times with independently, selected C$_{1-24}$alkyl groups and OH groups;

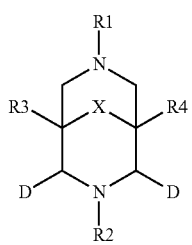
(VI)

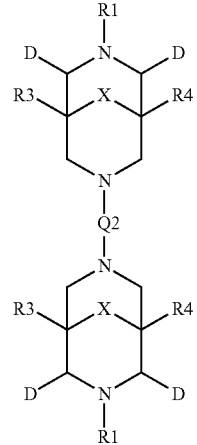
(VI-B)

wherein:

each D is independently selected from the group consisting of pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl, each of which may be optionally substituted by one or more groups independently selected from the group consisting of —F, —Cl, —Br, —OH, —OC$_1$-C$_4$alkyl, —NH—CO—H, —NH—CO—C$_1$-C$_4$alkyl, —NH$_2$, —NH—C$_1$-C$_4$alkyl, and —C$_1$-C$_4$alkyl;

the or each R1 and R2 are independently selected from the group consisting of C$_1$-C$_{24}$aryl and C$_{6-10}$aryl and C$_{6-10}$arylC$_1$-C$_{24}$alkyl, each of which may be optionally substituted by one or more groups selected from —F, —Cl, —Br, —OH, —OC$_1$-C$_4$alkyl, —NH—CO—H, —NH—CO—C$_1$-C$_4$alkyl, —NH$_2$, —NH—C$_1$-C$_4$alkyl, and —SC$_1$-C$_4$alkyl;

R3 and R4 are independently selected from hydrogen, C$_1$-C$_8$alkyl, C$_1$-C$_8$alkyl-O—C$_1$-C$_8$alkyl, C$_6$-C$_{10}$aryloxyC$_1$-C$_8$alkyl, C$_6$-C$_{10}$aryl, hydroxyC$_1$-C$_8$alkyl and —(CH$_2$)$_{0-4}$C(O)OR5 wherein R5 is independently selected from: hydrogen, C$_1$-C$_8$alkyl and C$_{6-10}$aryl;

Q2 represents a bridge selected from the group consisting of a C$_{1-6}$alkylene moiety, a C$_{6-10}$arylene moiety or a moiety comprising one or two C$_{1-3}$alkylene units and one C$_{6-10}$arylene unit, which bridge is optionally substituted one or more times with independently selected C$_{1-24}$alkyl groups and OH groups; and X is selected from C═O, —[C(R6)$_2$]$_{0-3}$— wherein each R6 is independently selected from hydrogen, hydroxyl, C$_1$-C$_4$alkoxy and C$_1$-C$_4$alkyl;

$$R1R2N—X—NR1R2 \quad (VII);$$

and $$R1R2N—X—NR2—Q2—R2N—X—NR1R2 \quad (VII-B);$$

wherein:

—X—is selected from —CY$_2$CY$_2$—, cis- or trans-1,2-cyclohexylene, —CY$_2$CY$_2$CY$_2$—, —CY$_2$C(OH)YCY$_2$—, with each Y being independently selected from H, CH$_3$, C$_2$H$_5$ and C$_3$H$^7$;

each R1 group is independently an alkyl, heterocycloalkyl, heteroaryl, aryl, arylalkyl or heteroarylalkyl group, each of which may be optionally substituted with a substituent selected from the group consisting of hydroxy, alkoxy, phenoxy, phosphonate, carboxylate, carboxamide, carboxylic ester, sulfonate, amine, mono- or dialkylamine and $N^+(R3)_3$, wherein R3 is selected from hydrogen, alkyl, alkenyl, arylalkyl, arylalkenyl, hydroxyalkyl, aminoalkyl, and alkyl ether, with the proviso that no R1 may be one of the possibilities permitted for R2;

each —R2 group is independently —$CZ_2$—R4, with each Z being independently selected from H, $CH_3$, $C_2H_5$, $C_3H_7$; and each —R4 being independently selected from optionally substituted —$N(C_1-C_{24}alkyl)_2$; —NR7, wherein each —NR7 independently represents a moiety in which R7 and the nitrogen atom N to which it is attached represent a heterocycloalkyl group optionally substituted with one or more $C_{1-6}$alkyl groups, which is connected to $CZ_2$ through the nitrogen atom N; and an optionally $C_1$-$C_6$alkyl-substituted heteroaryl group selected from the group consisting of pyridin-2-yl, pyrazin-2-yl, quinolin-2-yl, pyrazol-3-yl, pyrazol-1-yl, pyrrol-2-yl, imidazol-2-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl; and Q2 is a bridge selected from the group consisting of a $C_{1-6}$alkylene bridge, a $C_{6-10}$arylene bridge or a bridge comprising one or two $C_{1-3}$alkylene units and one $C_{6-10}$ arylene unit, which bridge may be optionally substituted one or more times with independently selected $C_{1-24}$alkyl groups and OH groups; and

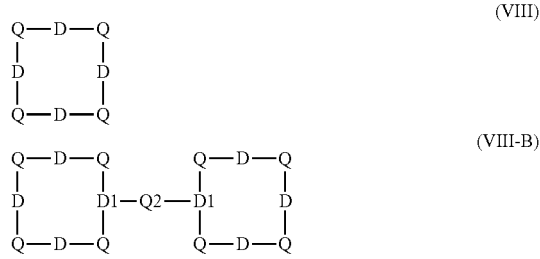

(VIII)

(VIII-B)

wherein:
each Q group independently represents —$CY_2$— or —$CY_2CY_2$—, in which each Y is independently selected from hydrogen, $C_{1-24}$alkyl, or a $C_{6-10}$aryl;

each D group independently represents a heteroarylene group or a group of the formula —NR—, with the proviso that at least one D group represents a heteroarylene group;

each D1 group represents a group of the formula —NR'—;

the two —R' groups of the two D1 groups together form bridging moiety —Q2—;

Q2 is a bridge selected from the group consisting of a $C_{1-6}$alkylene moiety, a $C_{6-10}$arylene moiety, or a moiety comprising one or two $C_1$-$C_3$alkylene units and one $C_6$-$C_{10}$arylene unit, which bridge may be optionally substituted one or more times with independently selected $C_{1-24}$alkyl groups and OH groups; and each R group independently represents H, $C_{1-24}$alkyl, $C_{6-10}$aryl or $C_{5-10}$heteroaryl.

10. The aqueous medium of claim 8, wherein the complex comprises a polydentate ligand selected from the group consisting of those of formulae (I), (II), (III), (IV), (V), (VI), (VII) and (VIII).

11. The aqueous medium of claim 1, wherein the complex comprises a Schiff-base ligand of formulae (IX) or (X):

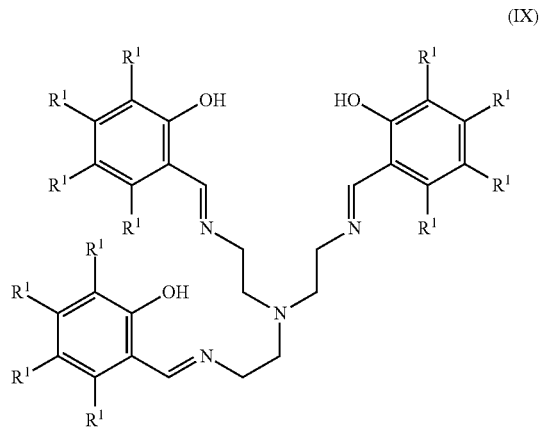

wherein:
each $R^1$ may be independently hydrogen or selected from the group consisting of cyano; halo; OR; COOR; nitro; linear or branched $C_{1-8}$alkyl; linear or branched partially, fluorinated or perfluorinated $C_{1-8}$alkyl; NR'R"; linear or branched $C_{1-8}$alkyl-R'"; wherein —R'" is —$NH_2$, —OR, —COOR or —NR'R"; or —$CH_2N^+$RR'R" or —$N^+RR'R"$, wherein each R is independently hydrogen or linear or branched $C_{1-4}$alkyl; and each R' and R" is independently hydrogen or linear or branched $C_{1-12}$alkyl; and

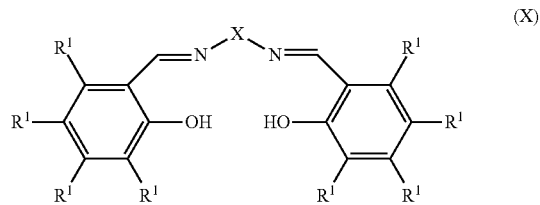

wherein:
each $R^1$ may be independently hydrogen or selected from the group consisting of cyano; halo; OR; COOR; nitro; linear or branched $C_{1-8}$alkyl; linear or branched partially, fluorinated or perfluorinated $C_{1-8}$alkyl; NR'R"; linear or branched $C_{1-8}$alkyl-R'" wherein —R'" is —$NH_2$, —OR, —COOR or —NR'R"; or —$CH_2N^+$RR'R" or —$N^+RR'R"$, wherein each R is independently hydrogen or linear or branched $C_{1-4}$alkyl; each R' and R" is independently hydrogen or linear or branched $C_{1-12}$alkyl); and X is $C_{2-8}$alkylene, optionally substituted by cyano, halo, OR, COOR or nitro).

12. The aqueous medium of claim 1, wherein the complex comprises a polydentate ligand selected from the group consisting of dimethyl 2,4-di-(2-pyridyl)-3,7-dimethyl-3,7-diaza-bicyclo[3.3.1]nonan-9-one-1,5-dicarboxylate, dimethyl 2,4-di-(2-pyridyl)-3,7-dibutyl-3,7-diaza-bicyclo[3.3.1]nonan-9-one-1,5-dicarboxylate, dimethyl 2,4-di-(2-pyridyl)-3,7-dioctyl-3,7-diaza-bicyclo[3.3.1]nonan-9-one-1,5-dicarboxylate, dimethyl 2,4-di-(2-pyridyl)-3,7-dibenzyl-3,7-diaza-bicyclo[3.3.1]nonan-9-one-1,5-di carboxylate, 1-(pyridin-2-ylmethyl)-4,7-dimethyl-1,4,7-triazacyclononane, 1,2-bis(4-methyl-7-pyridin-2-yl-1,4,7-triazacyclonon-1-yl)-ethane and 1,3-bis(4-methyl-7-pyridin-2-yl-1,4,7-triazacyclonon-1-yl)-propane, 1,4,7,10-tetraazacyclododecane, 1,4,7,10-tetramethyl-1,4,7,10-tetraazacyclododecane, 1,4,8,11-tetraazacyclododecane, 1,4,8,11-tetramethyl-1,4,8,11-tetraazacyclododecane, 5,12-dimethyl-1,5,8,12-tetraaza-bicyclo[6.6.2]hexadecane, 5,12-dibenzyl-1,5,8,12-tetraaza-bicyclo[6.6.2]hexadecane, N-methyl-N-(pyridin-2-yl-methyl)-bis(pyridin-2-yl)methylamine, N-benzyl-N-(pyridin-2-yl-methyl)-bis(pyridin-2-yl)methylamine, N-methyl-N-(pyridin-2-yl-methyl-1,1-bis(pyridin-2-yl)-1-aminoethane, N-benzyl-N-(pyridin-2-yl-methyl-1,1-bis(pyridin-2-yl)-1-aminoethane), N-methyl-N-(pyridin-2-yl-methyl-1,1-bis(pyridin-2-yl)-2-phenyl-1-aminoethane, N-benzyl-N-(pyridin-2-yl-methyl-1,1-bis(pyridin-2-yl)-2-phenyl-1-aminoethane, 1,2-bis(N-(pyridin-2-yl-methyl)-bis(pyridin-2-yl)methylaminyl)-ethane,1,3-bis(N-(pyridin-2-yl-methyl)-bis(pyridin-2-yl)methylaminyl)-propane, 1,3-bis(N-(pyridin-2-yl-methyl)-bis(pyridin-2-yl)methylaminyl)-propan-2-ol, N,N'-dimethyl-N,N'-bis(pyridin-2-ylmethyl)ethylene-1-2-diamine, N,N'-dimethyl-N,N'-bis(pyridin-2-ylmethyl)-cyclohexane-1-2-diamine, N,N,N-tris(pyridin-2-ylmethyl)amine, 2,11-diaza[3.3](2,6-pyridinophane), N,N'-dimethyl-2,11-diaza[3,3](2,6-pyridinophane), N,N',N''-tris[salicylideneaminoethyl] amine or 1,1'-[1,2-ethanediylbis (nitrilomethylidyne)]bis-2-phenol.

13. The aqueous medium of claim 1, wherein the complex comprises a polydentate ligand selected from the group consisting of 1,4-dimethyl-7-(pyridin-2-ylmethyl)-1,4,7-triazacyclononane, 4,11-dimethyl-1,4,8,11-tetraazabicyc[6.6.2] hexane, tris(pyridin-2-ylmethyl)amine and N-methyl-N-(pyridin-2-yl-methyl)-bis(pyridin-2-yl)methylamine.

14. The method of claim 3, wherein the complex comprises a chelant capable of chelating at least one manganese ion through four nitrogen atoms, which is of formulae (I), (I-B), (II), (III), (IV), (V), (V-B), (V-C), (VI), (VI-B), (VII), (VII-B), (VIII) or (VIII-B):

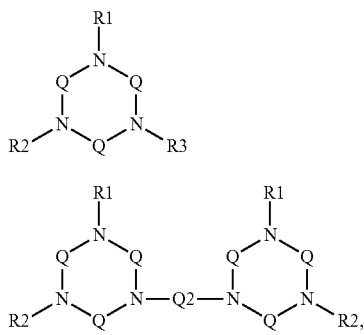

wherein:
each Q is independently selected from —CR4R5CR6R7— and —CR4R5CR6R7CR8R9—;
R4, R5, R6, R7, R8, and R9 are independently selected from: H, $C_1$-$C_4$alkyl and hydroxy $C_{1-4}$alkyl;
each R1 is independently selected from the group consisting of pyridin-2-ylmethyl, quinolin-2-ylmethyl, imidazol-2-ylmethyl, benzimidazol-2-ylmethyl, pyrazin-2-ylmethyl, pyrazol-1-ylmethyl, pyrazol-3-ylmethyl, 1,2,3-triazol-2-ylmethyl, 1,2,3-triazol-4-ylmethyl, 1,2,4-triazol-1-ylmethyl, 1,2,4-triazol-3-ylmethyl, thiazol-2-ylmethyl and $CH_2CH_2N(R10)(R11)$, wherein N(R10)(R11) is selected from the group consisting of di($C_{1-44}$alkyl)amino; di($C_{6-10}$aryl)amino in which each of the aryl groups is independently optionally substituted with one or more $C_{1-20}$alkyl groups; di($C_{6-10}$aryl$C_{1-6}$)amino in which each of the aryl groups is independently optionally substituted with one or more $C_{1-20}$alkyl groups; NR7, in which R7 and the nitrogen atom N to which it is attached represent a heterocycloalkyl group optionally substituted with one or more $C_{1-20}$alkyl groups, which is connected to the remainder of R1 through the nitrogen atom N; di(heterocycloalkyl$C_{1-6}$alkyl)amino, in which each of the heterocycloalkyl groups is independently optionally substituted with one or more $C_{1-20}$alkyl groups; and di(heteroaryl$C_{1-6}$alkyl)amino, wherein each of the heteroaryl groups is independently optionally substituted with one or more $C_{1-20}$alkyl groups;
each R2 is independently selected from: hydrogen, $C_1$-$C_{24}$alkyl, $CH_2CH_2OH$, $CH_2COOH$ and $CH_2PO_3H_2$;
R3 is selected from the group consisting of H, $C_{1-24}$alkyl, $CH_2CH_2OH$, $CH_2COOH$ and $CH_2PO_3H_2$; and
Q2 is a bridge selected from the group consisting of a $C_{1-6}$alkylene moiety, a $C_{6-10}$arylene moiety or a moiety comprising one or two $C_{1-3}$alkylene units and one $C_{6-10}$arylene unit, which bridge may be optionally substituted one or more times with independently selected $C_{1-24}$alkyl groups and OH groups;

wherein:
each —Q— is independently selected from —N(R)C(R$_1$)(R$_2$)C(R$_3$)(R$_4$)— and —N(R)C(R$_1$)(R$_2$)C(R$_3$)(R$_4$)C(R$_5$)(R$_6$)—;
each —Q1— is independently selected from —N(R')C(R$_1$)(R$_2$)C(R$_3$)(R$_4$)— and —N(R')C(R$_1$)(R$_2$)C(R$_3$)(R$_4$)C(R$_5$)(R$_6$)—;
each R is independently selected from: hydrogen or is selected from the group consisting of $C_1$-$C_{20}$alkyl, $C_2$-$C_{20}$alkenyl, $C_2$-$C_{20}$alkynyl, $C_6$-$C_{10}$aryl and $C_7$-$C_{20}$arylalkyl, each of which may be optionally substituted with $C_1$-$C_6$alkyl;
the two —R' groups of the two Q1 groups together form bridging moiety —Q2—;
Q2 is a bridge selected from the group consisting of a $C_{2-6}$alkylene moiety, a $C_{6-10}$arylene moiety, or a moiety comprising one or two $C_1$-$C_3$alkylene units and one $C_6$-$C_{10}$arylene unit, which bridge may be optionally substituted one or more times with independently selected $C_{1-24}$alkyl groups; and
R$_1$-R$_6$ are each independently selected from: H, $C_{1-4}$alkyl and hydroxy$C_{1-4}$alkyl;

N(CY$_2$—R1)$_3$ (IV)

wherein:
each —R1 is independently selected from —CY$_2$N(C$_1$-C$_{24}$alkyl)$_2$; —CY$_2$NR7, in which R7 and the nitrogen atom N to which it is attached represent a heterocycloalkyl group optionally substituted with one or more $C_{1-6}$alkyl groups, which is connected to the remainder of R1 through the nitrogen atom N; or represents an optionally $C_1$-$C_6$alkyl-substituted heteroaryl group selected from pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl; 1,2,4-triazol-3-yl and thiazol-2-yl; and each Y is independently selected from H, $CH_3$, $C_2H_5$, $C_3H_7$;

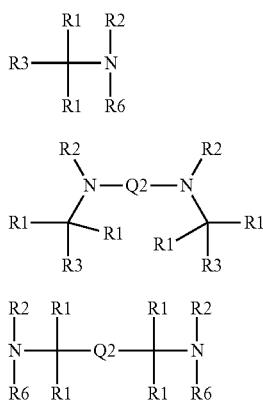

wherein:
each —R1 independently is selected from —$CH_2N(C_1$-$C_{24}$alkyl$)_2$, —$CH_2NR7$ or an optionally $C_1$-$C_6$alkyl-substituted heteroaryl group selected from pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl);

each —R2 independently represents —R4—R5;

each R3 and each R6 each independently represents hydrogen, or a group selected from $C_1$-$C_6$alkyl, $C_6$-$C_{10}$aryl, $C_5$-$C_{10}$heteroaryl, $C_6$-$C_{10}$aryl$C_1$-$C_6$alkyl and $C_5$-$C_{10}$heteroaryl$C_1$-$C_6$alkyl, each of which group may be optionally $C_1$-$C_6$alkyl-substituted, with the proviso that no —R3 or —R6 may be one of the possibilities permitted for —R1;

each —R4— independently represents optionally $C_1$-$C_6$alkyl-substituted $C_1$-$C_6$alkylene;

each —R5 independently represents an —$CH_2N(C_1$-$C_{24}$alkyl$)_2$ group, —$CH_2NR7$ or an optionally $C_1$-$C_6$alkyl-substituted heteroaryl group selected from the group consisting of pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl;

each —NR7 independently represents a moiety in which R7 and the nitrogen atom N to which it is attached represent a heterocycloalkyl group optionally substituted with one or more $C_{1-20}$alkyl groups, which is connected to R4 through the nitrogen atom N; and Q2 represents a bridge selected from the group consisting of a $C_{1-6}$alkylene moiety $C_{6-10}$arylene moiety or a moiety comprising one or two $C_{1-3}$alkylene units and one $C_{6-10}$arylene unit, which bridge is optionally substituted one or more times with independently selected $C_{1-24}$alkyl groups and OH groups;

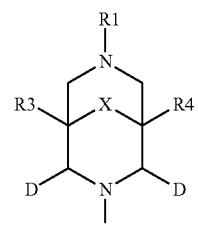

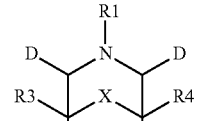

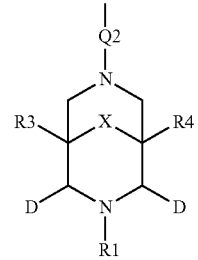

wherein:
each D is independently selected from the group consisting of pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl 1,2,4-triazol-1-yl, 1,2,4-triazol-3-yl and thiazol-2-yl, each of which may be optionally substituted by one or more groups independently selected from the group consisting of —F, —Cl, —Br, —OH, —$OC_1$-$C_4$alkyl, —NH—CO—$C_1$-$C_4$alkyl, —$NH_2$, —NH—$C_1$-$C_4$alkyl, and —$C_1$-$C_4$alkyl;

the or each R1 and R2 are independently selected from the group consisting of $C_1$-$C_{24}$alkyl, $C_{6-10}$aryl and $C_{6-10}$aryl$C_1$-$C_{24}$alkyl, each of which may be optionally substituted by one or more groups selected from —F, —Cl, —Br, —OH, —$OC_1$-$C_4$alkyl, —NH—CO—H, —NH—CO—$C_1$-$C_4$alkyl, —$NH_2$, —NH—$C_1$-$C_4$alkyl, and —$SC_1$-$C_4$alkyl;

R3 and R4 are independently selected from hydrogen, $C_1$-$C_8$alkyl, $C_1$-$C_8$alkyl-O—$C_1$-$C_8$alkyl, $C_6$-$C_{10}$aryloxy$C_1$-$C_8$alkyl, $C_6$-$C_{10}$aryl, hydroxy$C_1$-$C_8$alkyl and —$(CH_2)_{0-4}C(O)OR5$ wherein R5 is independently selected from: hydrogen, $C_1$-$C_8$alkyl and $C_{6-10}$aryl;

Q2 represents a bridge selected from the group consisting of a $C_{1-6}$alkylene moiety, a $C_{6-10}$arylene moiety or a moiety comprising one or two $C_{1-3}$alkylene units and one $C_{6-10}$arylene unit, which bridge is optionally substituted one or more times with independently selected $C_{1-24}$alkyl groups and OH groups; and X is selected from C=O, —[C(R6)$_2$]$_{0-3}$— wherein each R6 is independently selected from hydrogen, hydroxyl, C$_1$-C$_4$alkoxy and C$_1$-C$_4$alkyl;

(VII);

and

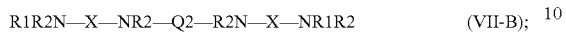

(VII-B);

wherein:
—X— is selected from —CY$_2$CY$_2$—, cis- or trans-1,2-cyclohexylene, —CY$_2$CY$_2$CY$_2$—, —CY$_2$C(OH)YCY$_2$—, with each Y being independently selected from H, CH$_3$, C$_2$H$_5$ and C$_3$H$_7$;

each R1 group is independently an alkyl, heterocycloalkyl, heteroaryl, aryl, arylalkyl or heteroarylalkyl group, each of which may be optionally substituted with a substituent selected from the group consisting of hydroxy, alkoxy, phenoxy, phosphonate, carboxylate, carboxamide, carboxylic ester, sulfonate, amine, mono- or dialkylamine and N$^+$(R3)$_3$, wherein R3 is selected from hydrogen, alkyl, alkenyl, arylalkyl, arylalkenyl, hydroxyalkyl, aminoalkyl, and alkyl ether, with the proviso that no R1 may be one of the possibilities permitted for R2;

each —R2 group is independently —CZ$_2$—R4, with each Z being independently selected from H, CH$_3$, C$_2$H$_5$, C$_3$H$_7$; and each —R4 being independently selected from optionally substituted —N(C$_1$-C$_{24}$alkyl)$_2$; —NR7, wherein each —NR7 independently represents a moiety in which R7 and the nitrogen atom N to which it is attached represent a heterocycloalkyl group optionally substituted with one or more C$_{1-6}$alkyl groups, which is connected to CZ$_2$ through the nitrogen atom N; and an optionally C$_1$-C$_6$alkyl-substituted heteroaryl group selected from the group consisting of pyridin-2-yl, pyrazin-2-yl, quinolin-2-yl, pyrazol-3-yl, pyrazol-1-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-0 and thiazol-2-yl; and Q2 is a bridge selected from the group consisting of a C$_{1-6}$alkylene bridge, a C$_{6-10}$arylene bridge or a bridge comprising one or two C$_{1-3}$alkylene units and one C$_{6-10}$arylene unit, which bridge may be optionally substituted one or more times with independently selected C$_{1-24}$alkyl groups and OH groups; and

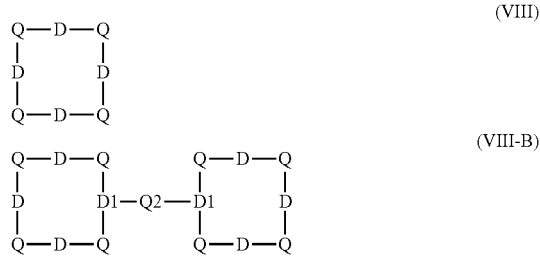

wherein:
each Q group independently represents —CY$_2$— or —CY$_2$CY$_2$—in which each Y is independently selected from hydrogen, C$_{1-24}$alkyl, or a C$_{6-10}$aryl;

each group independently represents a heteroarylene group or a group of the formula —NR—, with the proviso that at least one D group represents a heteroarylene group;

each D1 group represents a group of the formula —NR'—;

the two —R' groups of the two D1 groups together form bridging moiety —Q2—;

Q2 is a bridge selected from the group consisting of a C$_{1-6}$alkylene moiety, a C$_{6-10}$arylene moiety, or a moiety comprising one or two C$_1$-C$_3$alkylene units and one C$_6$-C$_{10}$arylene unit; which bridge may be optionally substituted one or more times with independently selected C$_{1-24}$alkyl groups and OH groups; and each R group independently represents H, C$_{1-24}$alkyl, C$_{6-10}$aryl or C$_{5-10}$heteroaryl.

15. The method of claim 14, wherein the complex comprises a polydentate ligand selected from the group consisting of those of formulae (I), (II), (III), (IV), (V), (VI), (VII) and (VIII).

16. The method of claim 3, wherein the complex comprises a Schiff-base ligand of formulae (IX) or (X):

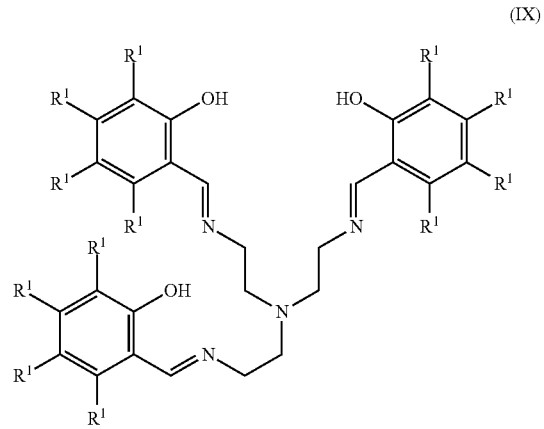

(IX)

wherein:
each R$^1$ may be independently hydrogen or selected from the group consisting of cyano; halo; OR; COOR; nitro; linear or branched C$_{1-8}$alkyl; linear or branched partially, fluorinated or perfluorinated C$_{1-8}$alkyl; NR'R"; linear or branched C$_{1-8}$alkyl-R'", wherein —R'" is —NH$_2$, —OR, —COOR or —NR'R"; or —CH$_2$N$^+$RR'R" or —N$^+$RR'R", wherein each R is independently hydrogen or linear or branched C$_{1-4}$alkyl; and each R' and R" is independently hydrogen or linear or branched C$_{1-12}$alkyl; and

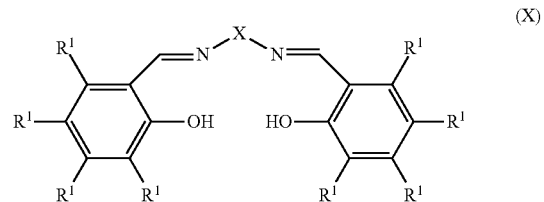

(X)

wherein:
each R$^1$ may be independently hydrogen or selected from the group consisting of cyano; halo; OR; COOR; nitro;

linear or branched $C_{1-8}$alkyl; linear or branched partially, fluorinated or perfluorinated $C_{1-8}$alkyl; NR'R"; linear or branched $C_{1-8}$ alkyl-R''', wherein —R''' is —NH$_2$, —OR, —COOR or —NR'R"; or —CH$_2$N$^+$RR'R" or —N$^+$RR'R", wherein each R is independently hydrogen or linear or branched $C_{1-4}$alkyl; each R' and R" is independently hydrogen or linear or branched $C_{1-12}$alkyl); and X is $C_{2-8}$alkylene, optionally substituted by cyano, halo, OR, COOR or nitro).

17. The method of claim 3, wherein the complex comprises a polydentate ligand selected from the group consisting of dimethyl 2,4-di-(2-pyridyl)-3,7-dimethyl-3,7-diaza-bicyclo[3.3.1]nonan-9-one-1,5-dicarboxylate, dimethyl 2,4-di-(2-pyridyl)-3,7-dibutyl-3,7-diaza-bicyclo[3.3.1]nonan-9-one-1,5-dicarboxylate, dimethyl 2,4-di-(2-pyridyl)-3,7-dioctyl-3,7-diaza-bicyclo[3.3.1]nonan-9-one-1,5-dicarboxylate, dimethyl 2,4-di-(2-pyridyl)-3,7-dibenzyl-3,7-diaza-bicyclo[3.3.1]nonan-9-one-1,5-dicarboxylate, 1-(pyridin-2-ylmethyl)-4,7-dimethyl-1,4,7-triazacyclononane, 1,2-bis(4-methyl-7-pyridin-2-yl-1,4,7-triazacyclonon-1-yl)-ethane and 1,3-bis(4-methyl-7-pyridin-2-yl-1,4,7-triazacyclonon-1-yl)-propane, 1,4,7,10-tetraazacyclododecane, 1,4,7,10-tetramethyl-1,4,7,10-tetraazacyclododecane, 1,4,8,11-tetraazacyclododecane, 1,4,8,11-tetramethyl-1,4,8,11-tetraazacyclododecane, 5,12 dimethyl-1,5,8,12-tetraaza-bicyclo[6.6.2]hexadecane, 5,12-dibenzyl-1,5,8,12-tetraaza-bicyclo[6.6.2]hexadecane, N-methyl-N-(pyridin-2-yl-methyl)-bis(pyridin-2-yl)methylamine, N-benzyl —N-(pyridin-2-yl-methyl)-bis(pyridin-2-yl)methylamine, —N-methyl-N-(pyridin-2-yl-methyl-1,1-bis(pyridin-2-yl)-1-aminoethane, N-benzyl-N-(pyridin-2-yl-methyl-1,1-bis(pyridin-2-yl)-1-aminoethane), N-methyl-N-(pyridin-2-yl-methyl-1,1-bis(pyridin-2-yl)-2-phenyl-1-aminoethane, N-benzyl-N-(pyridin-2-yl-methyl-1,1-bis(pyridin-2-yl)-2-phenyl-1-aminoethane, 1,2-bis(N-(pyridin-2-yl-methyl)-bis(pyridin-2-yl)methylaminyl)-ethane,1,3-bis(N-(pyridin-2-yl-methyl)-bis(pyridin-2-yl)methylaminyl)-propane, 1,3-bis(N-(pyridin-2-yl-methyl)-bis(pyridin-2-yl)methylaminyl)-propan-2-ol, N,N'-dimethyl-N,N'-bis(pyridin-2-ylmethyl)ethylene-1-2-diamine, N,N'-dimethyl-N,N'-bis(pyridin-2-ylmethyl)-cyclohexane-1-2-diamine, N,N,N-tris(pyridin-2-ylmethyl)amine, 2,11-diaza[3.31](2,6-pyridinophane), N,N'-dimethyl-2,11-diaza[3.3](2,6-pyridinophane), N,N',N"-tris[salicylideneaminoethyl] amine or 1,1'-[1,2-ethanediylbis(nitrilomethylidyne)]bis-2-phenol.

18. The method of claim 3, wherein the complex comprises a polydentate ligand selected from the group consisting of 1,4-dimethyl-7-(pyridin-2-ylmethyl)-1,4,7-triazacyclononane, 4,11-dimethyl-1,4,8,11-tetraazabicyclo[6.6.2]hexane, tris(pyridin-2-ylmethyl)amine) and N-methyl-N-(pyridin-2-yl-methyl)-bis(pyridin-2-yl)methylamine.

19. The method of claim 3, wherein the substrate is wood pulp.

* * * * *